United States Patent
Ito et al.

(10) Patent No.: US 6,569,502 B1
(45) Date of Patent: *May 27, 2003

(54) OPTICAL COMPENSATORY SHEET COMPRISING SUBSTRATE, ORIENTATION LAYER AND OPTICALLY ANISOTROPIC LAYER

(75) Inventors: Yoji Ito, Minami-ashigara (JP); Shigeki Yokoyama, Minami-ashigara (JP); Masayuki Negoro, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,108

(22) Filed: Jun. 24, 1999

(30) Foreign Application Priority Data

Jun. 24, 1998 (JP) .......................................... 10-193757
Jul. 31, 1998 (JP) .......................................... 10-230253

(51) Int. Cl.[7] ..................... G02F 1/1335; G02F 1/1337
(52) U.S. Cl. ..................... 428/1.1; 428/1.26; 428/1.27; 252/299.7; 349/117; 349/123; 349/121
(58) Field of Search ............................... 428/1.26, 1.27, 428/1.1, 1.3, 1.5; 252/299.7; 349/117, 121, 123, 134, 136, 135

(56) References Cited

U.S. PATENT DOCUMENTS

| | | | |
|---|---|---|---|
| 5,186,985 A | * 2/1993 | Estes et al. | 428/1 |
| 5,583,679 A | * 12/1996 | Ito et al. | 349/118 |
| 5,627,665 A | * 5/1997 | Yamada et al. | 349/156 |
| 5,667,854 A | * 9/1997 | Yamada | 428/1 |
| 5,855,971 A | 1/1999 | Kobori et al. | 428/1 |
| 6,485,798 B1 | * 11/2002 | Aminaka et al. | 428/1.1 |

OTHER PUBLICATIONS

Nippon Gosei Gomu KK, Mar. 1997, Derwent Abstract JP 09080441A.*

* cited by examiner

Primary Examiner—Harold Pyon
Assistant Examiner—Sow-Fun Hon
(74) Attorney, Agent, or Firm—Burns, Doane, Swecker & Mathis, LLP

(57) ABSTRACT

An optical compensatory sheet comprises a transparent substrate, an orientation layer and an optically anisotropic layer in order. The optically anisotropic layer comprises discotic liquid crystal molecules. The orientation layer comprises a polymer having a hydrocarbon side chain containing 10 or more carbon atoms or a fluoropolymer. The discotic liquid crystal molecules are aligned at an average inclined angle in the range of 50° to 90°. A liquid crystal display of an STN mode and a method of alignment of discotic liquid crystal molecules are also disclosed.

23 Claims, 5 Drawing Sheets

OPTICAL COMPENSATORY SHEET COMPRISING SUBSTRATE, ORIENTATION LAYER AND OPTICALLY ANISOTROPIC LAYER

FIELD OF THE INVENTION

The present invention relates to an optical compensatory sheet comprising a transparent substrate, an orientation layer and an optically anisotropic layer comprising discotic liquid crystal molecules in order. The invention also relates to a liquid crystal display of an STN mode. The invention further relates to a method of alignment of discotic liquid crystal molecules at an average inclined angle in the range of 50° to 90°.

BACKGROUND OF THE INVENTION

A liquid crystal display of an STN mode comprises a liquid crystal cell of an STN (Super Twisted Nematic) mode, two polarizing elements arranged on each side of the liquid crystal cell, and one or two optical compensatory sheets (phase retarders) arranged between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecule. The rod-like liquid crystal molecules are twisted by using a chiral agent. A twist angle of the molecules is in the range of 180° to 360°.

Without use of an optical compensatory sheet, a liquid crystal display of an STN mode displays an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. A stretched birefringent film has usually been used as the optical compensatory sheet. Japanese Patent Provisional Publication Nos. 7(1995)-104284 and 7(1995)-13021 disclose an optical compensatory sheet made of a stretched birefringent film for a liquid crystal display of an STN mode.

An optical compensatory sheet comprising an optically anisotropic layer on a transparent substrate has been proposed to be used in place of the stretched birefringent film. The optically anisotropic layer is formed by aligning discotic liquid crystal molecules and fixing the aligned molecules. The discotic liquid crystal molecules usually have large birefringence. The discotic liquid crystal molecules also have various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is disclosed in Japanese Patent Provisional Publication No. 6(1994)-214116, U.S. Pat. Nos. 5,583,679, 5,646,703 and German Patent Publication No. 3,911,620A1. However, the disclosed optical compensatory sheet is designed to be used in a liquid crystal display of a TN (Twisted Nematic) mode.

The optical compensatory sheet containing the discotic liquid crystal molecules should be redesigned to be used in a liquid crystal display of an STN.mode. In a liquid crystal cell of the STN mode, rod-like liquid crystal molecules are aligned according to a super twisted birefringent mode at a twist angle of larger than 90°. The liquid crystal display of the STN mode can display a clear image of a large volume according to a time-sharing addressing method even though the display has a simple matrix electrode structure (having no active matrix such as a thin film transistor or a diode).

The discotic liquid crystal molecules should be essentially vertically aligned (homogeneously aligned) to optically compensate the liquid crystal cell of the STN mode. The discotic liquid crystal molecules are preferably further twisted. Japanese Patent Provisional Publication No. 9(1997)-26572 discloses an optical compensatory sheet in which discotic liquid crystal molecules are twisted. The drawings of Japanese Patent Provisional Publication No. 9(1997)-26572 further illustrate that discotic liquid crystal molecules are essentially vertically aligned.

SUMMERY OF THE INVENTION

It is technically difficult to align discotic liquid crystal molecules uniformly (monodomain alignment) from an interface facing an orientation layer to another interface facing the air according to the disclosures of Japanese Patent Provisional Publication No. 9(1997)-26572. If the discotic liquid crystal molecules are not uniformly aligned, disclination of the molecules causes scattered light, which decreases a contrast ratio of a displayed image.

Rod-like liquid crystal molecules used in a liquid crystal cell have been investigated to align the molecule essentially vertically (homeotropic alignment). For example, a liquid crystal display of a vertical alignment (VA) mode uses an orientation layer having a function of essentially vertically aligning rod-like liquid crystal molecules. In the liquid crystal display of the VA mode, rod-like liquid crystal molecules are essentially vertically aligned while not applying voltage to the cell, and are essentially horizontally aligned while applying voltage to the cell. Various orientation layers have been proposed to align rod-like liquid crystal molecules.

Discotic liquid crystal molecules are completely different from the rod-like liquid crystal molecules in molecular structures and in optical characteristics. Most of the orientation layers having a function of aligning rod-like liquid crystal molecules are not effective in aligning discotic liquid crystal molecules.

An object of the present invention is to provide an optical compensatory sheet suitable for a liquid crystal display of an STN mode.

Another object of the invention is to provide a liquid crystal display of an STN mode that can display a clear image of a high contrast, in which blue or yellow color caused by birefringence of rod-like liquid crystal molecule is reduced.

A further object of the invention is to provide a method for vertical, uniform and stable alignment of discotic liquid crystal molecules.

The present invention provides an optical compensatory sheet comprising a transparent substrate, an orientation layer and an optically anisotropic layer in order, said optically anisotropic layer comprising discotic liquid crystal molecules, wherein the orientation layer comprises a polymer having a hydrocarbon side chain containing 10 or more carbon atoms, said discotic liquid crystal molecules being aligned at an average inclined angle in the range of 50° to 90°.

The invention also provides a liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer comprising a polymer having a hydrocarbon side chain containing 10 or more carbon atoms, said discotic liquid crystal molecules being aligned at an average inclined angle in the range of 50° to 90°.

The invention further provides a method of alignment of discotic liquid crystal molecules, which comprises forming an optically anisotropic layer comprising discotic liquid crystal molecules on an orientation layer comprising a polymer having a hydrocarbon side chain containing 10 or more carbon atoms to align the discotic liquid crystal molecules at an average inclined angle in the range of 50° to 90°.

The invention furthermore provides an optical compensatory sheet comprising a transparent substrate, an orientation layer and an optically anisotropic layer in order, said optically anisotropic layer comprising discotic liquid crystal molecules, wherein the orientation layer contains a fluoropolymer, said discotic liquid crystal molecules being aligned at an average inclined angle in the range of 50° to 90°.

The invention still further provides a liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer comprising a fluoropolymer, and said discotic liquid crystal molecules being aligned at an average inclined angle in the range of 50° to 90°.

The invention still furthermore provides a method of alignment of discotic liquid crystal molecules, which comprises forming an optically anisotropic layer comprising discotic liquid crystal molecules on an orientation layer comprising a fluoropolymer to align the discotic liquid crystal molecules at an average inclined angle in the range of 50° to 90°.

In the present specification, the term "average inclined angle" means an average of angles between discotic planes of discotic liquid crystal molecules and a surface of a transparent substrate (or a surface of an orientation layer). The present specification refers to alignment of discotic liquid crystal molecules at an average inclined angle in the range of 50° to 90° as essentially vertical alignment of the molecules.

The applicants have succeeded in obtaining essentially vertical, uniform and stable alignment of discotic liquid crystal molecules by using a polymer having a hydrocarbon group containing 10 or more carbon atoms in its side chain or a fluoropolymer in an orientation layer.

An optical compensatory sheet suitable for a liquid crystal display of an STN mode is now obtained by using the discotic liquid crystal molecules of the essentially vertical, uniform and stable alignment. Thus, blue or yellow color is reduced in a liquid crystal display of an STN mode to display a clear image of a high contrast by using an optical compensatory sheet, in which the discotic liquid crystal molecules are essentially vertically aligned (and preferably twisted).

DETAILED DESCRIPTION OF THE INVENTION

Figure 1:
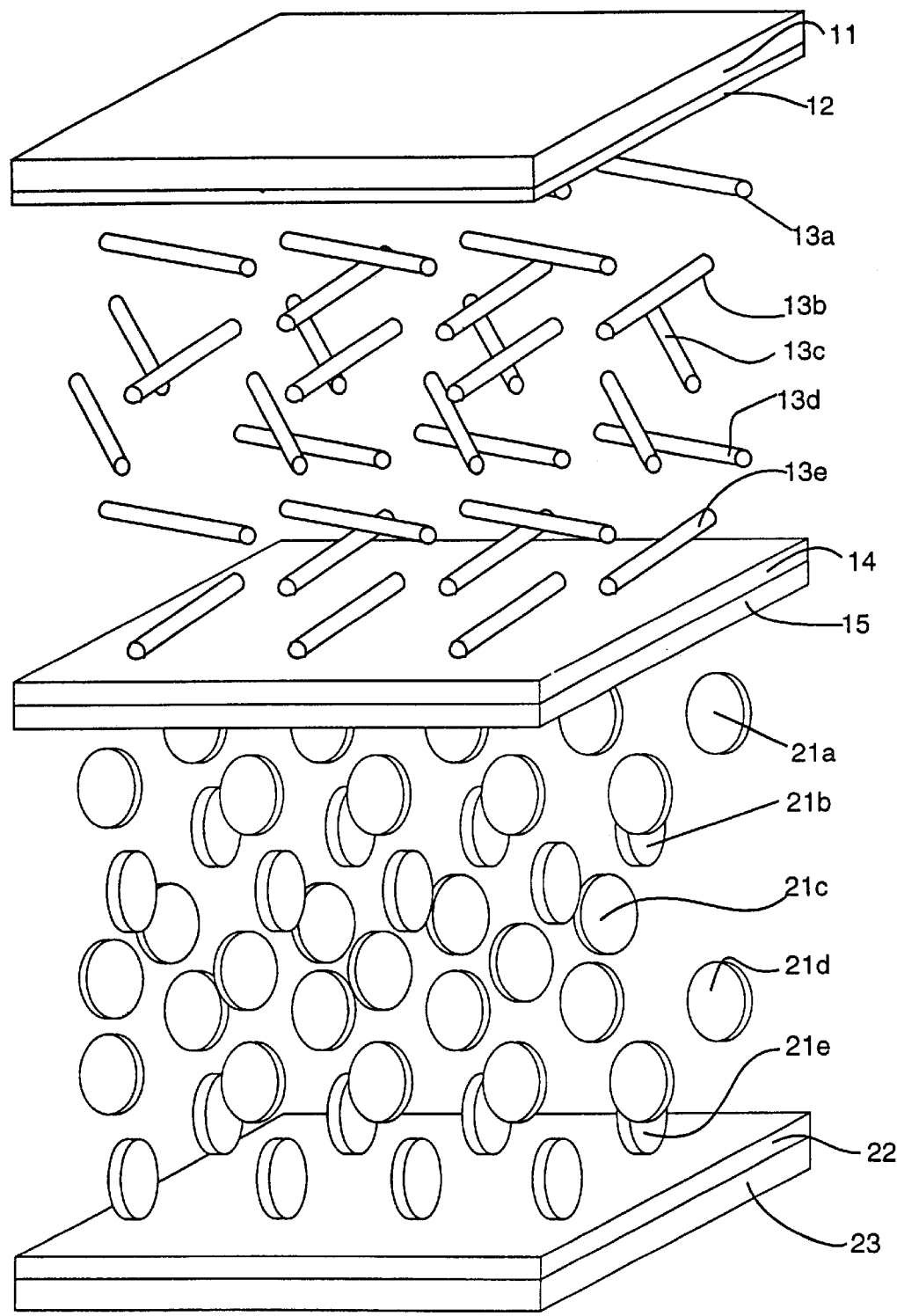
FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 1, a liquid crystal cell (11 to 15 comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules. (13a to 13e) are essentially horizontally aligned parallel to the surface of the orientation layers (12 & 14), as is shown in FIG. 1. The rod-like liquid crystal molecules (13a to 13e) are twisted along a thickness direction, and spiral on a plane (counterclockwise about 240° from 13a to 13e in FIG. 1).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 1 (off). On the other hand, the alignment of the other rod-like liquid crystal molecules (13a, 13e) neighboring the substrates (11, 15) is not essentially changed after applying voltage to the cell.

An optical compensatory sheet is provided under the liquid crystal cell. The optical compensatory sheet shown in FIG. 1 comprises a transparent substrate (23), an orientation layer (22) and an optically anisotropic layer in order. The optically anisotropic layer is formed by aligning discotic liquid crystal molecules (21a to 21e) and fixing the molecules while keeping the alignment.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 1).

In FIG. 1, alignment of each of the rod-like liquid crystal molecules corresponds to alignment of each of the discotic liquid crystal molecules, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 2.

Figure 2:
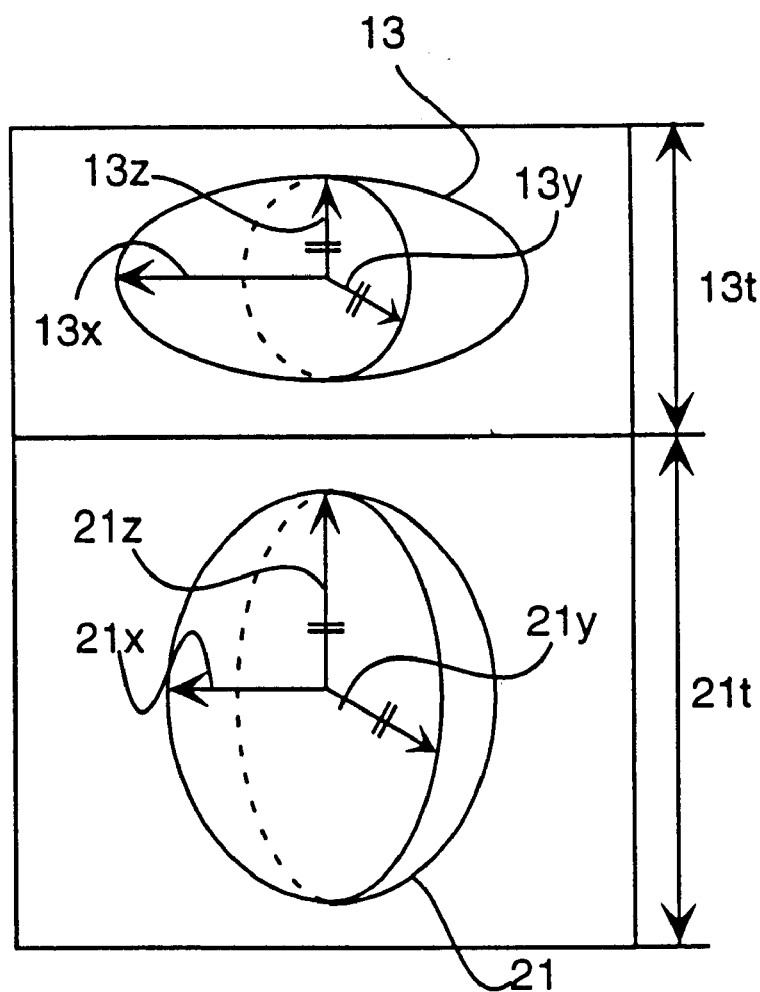
FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed by refractive indices (13x, 13y) in plane parallel to an orientation layer and a refractive index (13z) along a thickness direction. In a liquid crystal cell of an STN mode, the refractive index (13x) along one direction in place is relatively large, while the index (13y) along a direction perpendicular to the direction of (13x) is relatively small. The refractive index (13z) along the direction is also relatively small in a liquid crystal cell of an STN mode. Therefore, the refractive index ellipsoid (13) has a shape like a laid football, as is shown in FIG. 2. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed by refractive indices (21x, 21y) in plane parallel to an orientation layer and a refractive index (21z) along a thickness direction. The refractive index (21x) along one direction in place is relatively small, while the index (21y) along a direction perpendicular to the direction of (21x) is relatively small. The refractive index (121z) along the direction is also relatively large. These refractive indices are obtained by aligning a discotic liquid crystal molecule essentially vertically. Therefore, the refractive index ellipsoid (21) has a shape like a standing disk, as is shown in FIG. 2.

A retardation formed in a liquid crystal cell (1) can be compensated by a retardation formed in an optical compensatory sheet (2) because of the above-described relation. The dependency on a viewing angle of the liquid crystal cell can be canceled by adjusting optical characteristics of a rod-like liquid crystal molecule and a discotic liquid crystal molecule that has a director having the same direction as the director of the rod-like liquid crystal molecule. In more detail, the dependency on a viewing angle can be canceled by adjusting refractive indices (13x, 13y, 13z) of a rod-like liquid crystal molecule, refractive indices (21x, 21y, 21z) of a discotic liquid crystal molecule, a thickness (13t) of the rod-like liquid crystal molecule layer and a thickness (21t) of the discotic liquid crystal molecule layer according to the following formulas.

$$|(13x-13y)\times 13t|=|(21x-21y)\times 21t|$$

$$|(13x-13z)\times 13t|=|(21x-21z)\times 21t|$$

Figure 3:
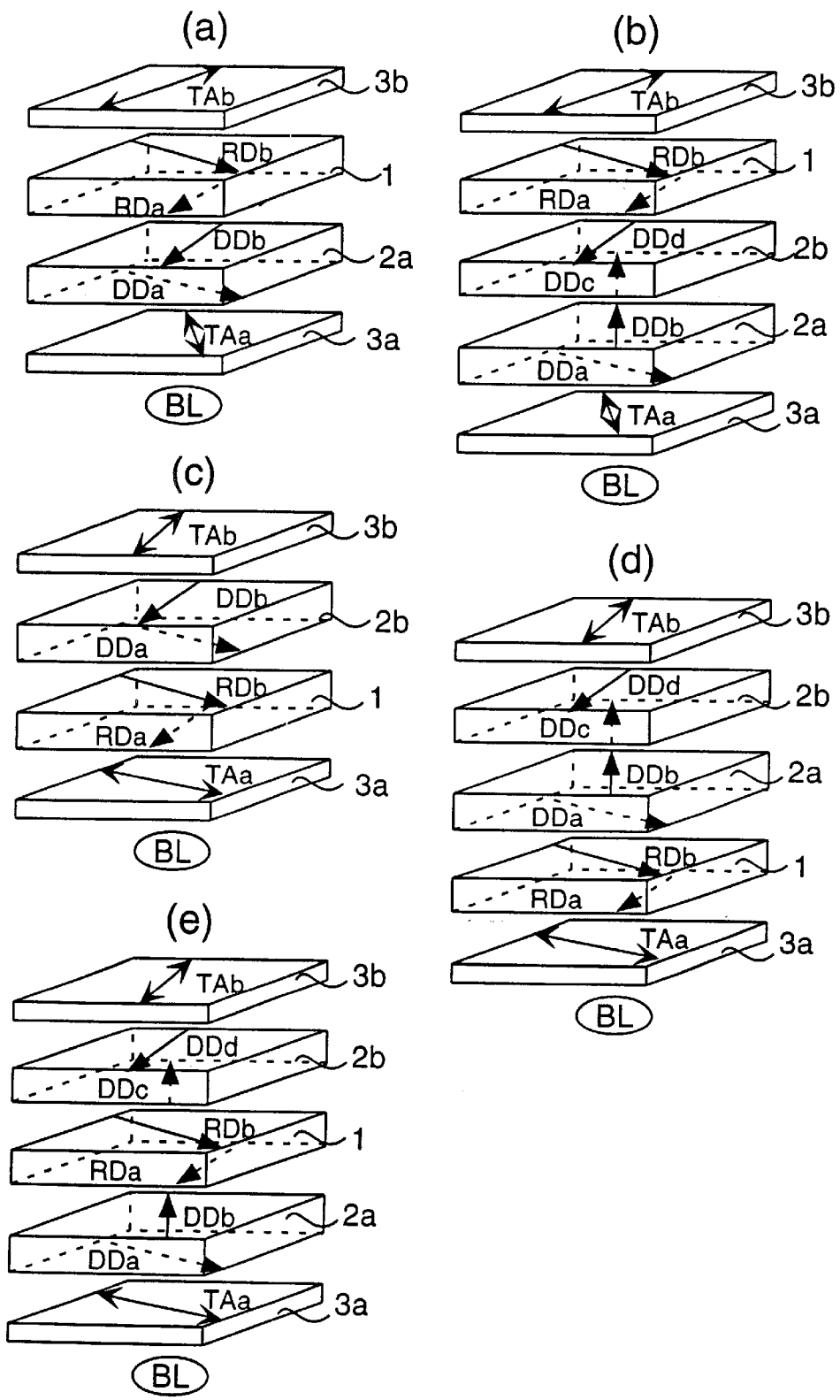
FIG. 3 schematically illustrates a layered structure of a liquid crystal display of an STN mode.

FIG. 3 schematically illustrates a layered structure of a liquid crystal display of an STN mode.

The liquid crystal display shown in FIG. 3(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 3(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 3(c) comprises a backlight (BL), a lower polarizing element (3a), a liquid crystal cell of an STN mode (1), an upper optical compensatory sheet (2b) and an upper polarizing element (3b) in order.

The liquid crystal display shown in FIG. 3(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 3(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 3 shows arrows, which indicate the following optical directions.

TAa: Transparent axis (TAa) of a lower polarizing element (3a)

DDa: Normal (director's) direction of a discotic plane of a discotic liquid crystal molecule adjacent to an orientation layer in a lower optical compensatory sheet (2a)

DDb: Normal (director's) direction of a discotic plane of a discotic liquid crystal molecule adjacent to a liquid crystal cell in a lower optical compensatory sheet (2a)

RDa: Rubbing direction of a lower orientation layer of a liquid crystal cell (1)

RDb: Rubbing direction of an upper orientation layer of a liquid crystal cell (1)

DDc: Normal (director's) direction of a discotic plane of a discotic liquid crystal molecule adjacent to a liquid crystal cell in an upper optical compensatory sheet (2b)

DDd: Normal (director's) direction of a discotic plane of a discotic liquid crystal molecule adjacent to an orientation layer in an upper optical compensatory sheet (2b)

TAa: Transparent axis (TAa) of an upper polarizing element (3b)

The angles between the optical directions are described below referring to FIG. 4 and FIG. 5.

Figure 4:
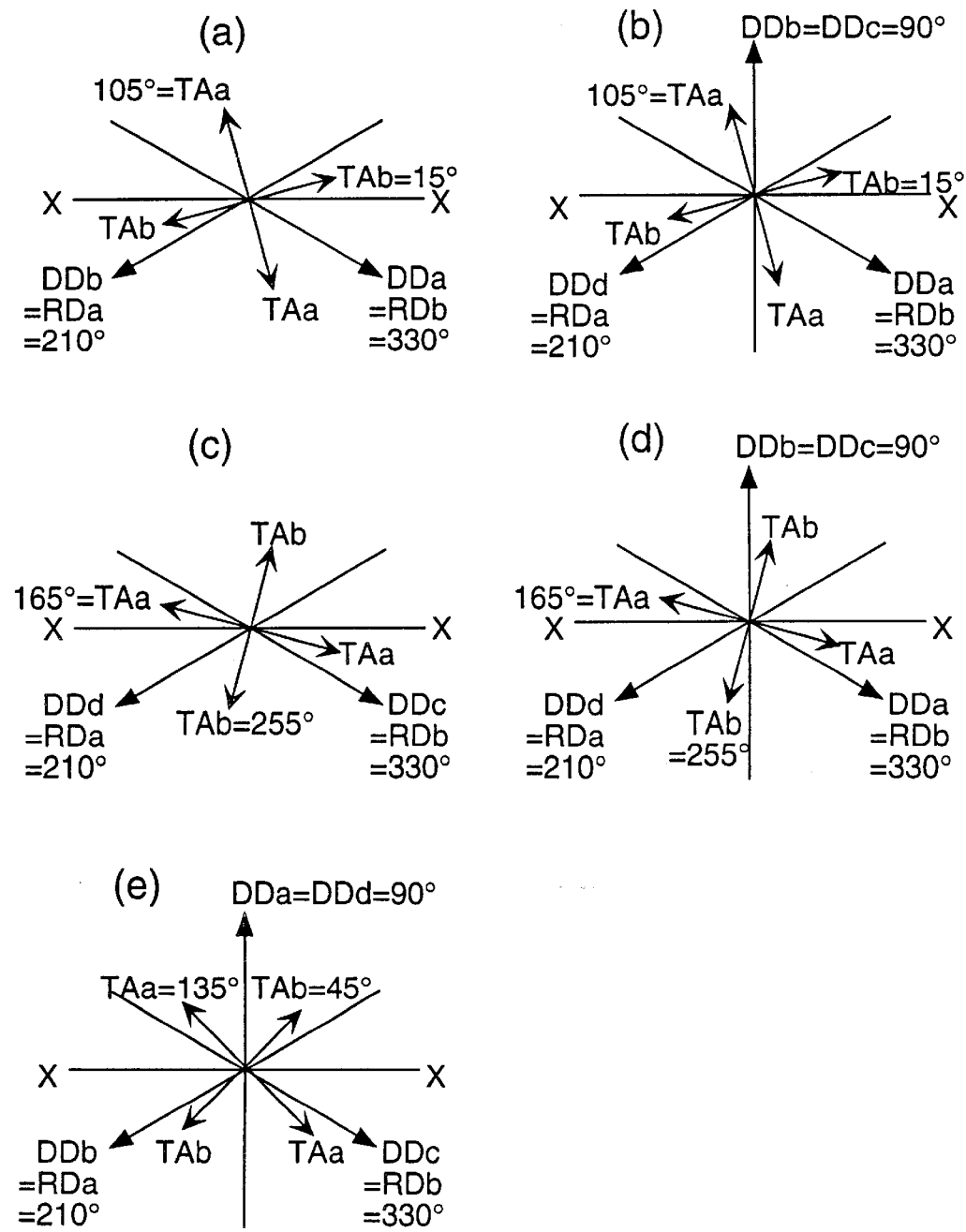
FIG. 4 is a plane view showing preferred optical directions about elements of a liquid crystal display of an STN mode.

FIG. 4 is a plane view showing preferred optical directions about elements of a liquid crystal display of an STN mode. FIG. 4 shows arrangements taking account of a front contrast.

FIG. 4(a) shows a liquid crystal display comprising one optical compensatory sheet between a lower polarizing element and a liquid crystal cell of an STN mode, as is shown in FIG. 3(a).

FIG. 4(b) shows a liquid crystal display comprising two optical compensatory sheets between a lower polarizing element and a liquid crystal cell of an STN mode, as is shown in FIG. 3(b).

FIG. 4(c) shows a liquid crystal display comprising one optical compensatory sheet between a liquid crystal cell of an STN mode and an upper polarizing element, as is shown in FIG. 3(c).

FIG. 4(d) shows a liquid crystal display comprising two optical compensatory sheets between a liquid crystal cell of an STN mode and an upper polarizing element, as is shown in FIG. 3(d).

FIG. 4(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 4, the line (X) means a standard direction (0°). The arrows shown in FIG. 4 have the same meanings as is described about FIG. 3. The transparent axis of the lower polarizing element (TAa) and the transparent axis of the upper polarizing element (TAb) can be replaced with each other.

Figure 5:
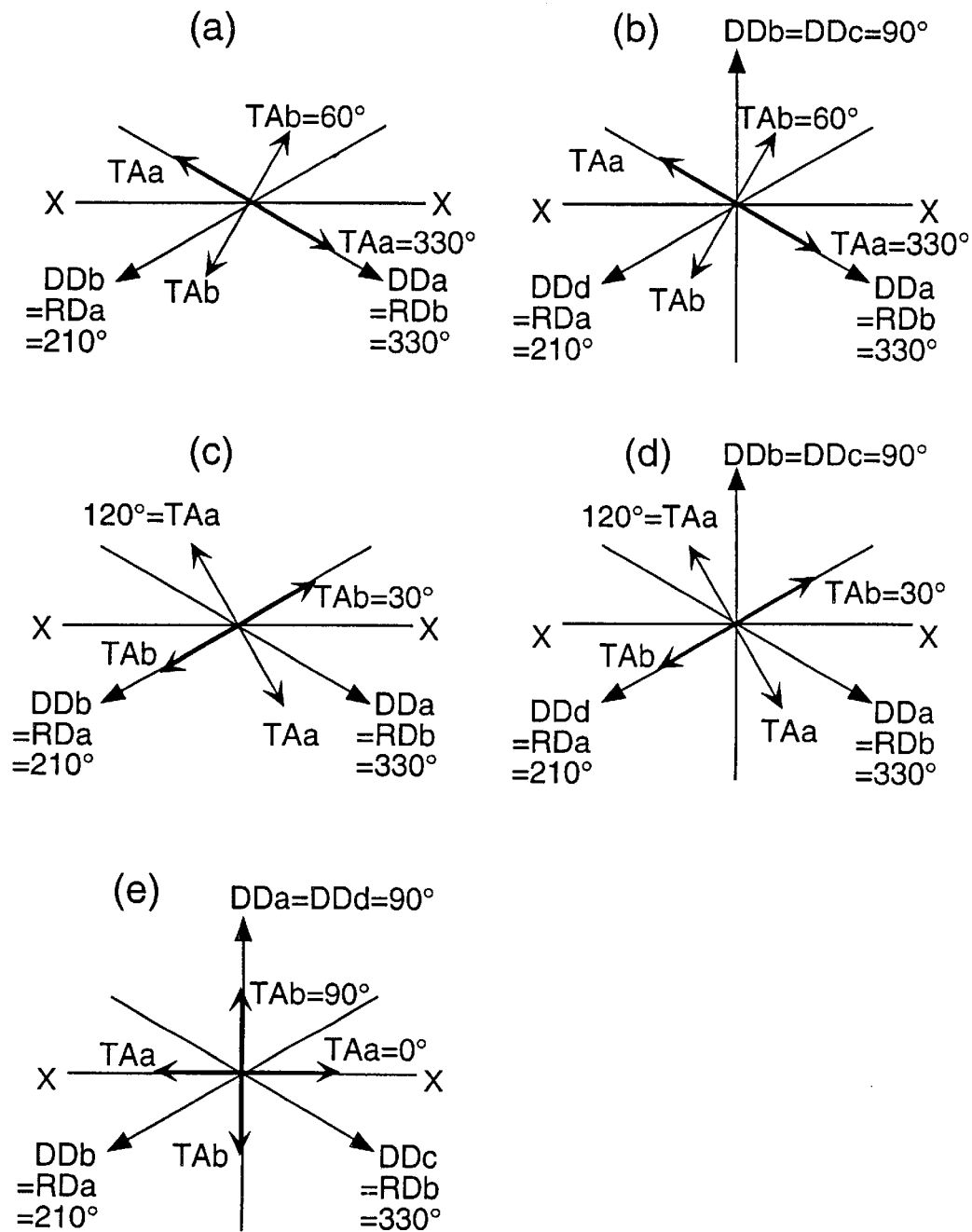
FIG. 5 is a plane view showing other preferred optical directions about elements of a liquid crystal display of an STN mode.

FIG. 5 is a plane view showing other preferred optical directions about elements of a liquid crystal display of an STN mode. FIG. 5 shows arrangements taking account of color of a displayed image.

FIG. 5(a) shows a liquid crystal display comprising one optical compensatory sheet between a lower polarizing element and a liquid crystal cell of an STN mode, as is shown in FIG. 3(a).

FIG. 5(b) shows a liquid crystal display comprising two optical compensatory sheets between a lower polarizing element and a liquid crystal cell of an STN mode, as is shown in FIG. 3(b).

FIG. 5(c) shows a liquid crystal display comprising one optical compensatory sheet between a liquid crystal cell of an STN mode and an upper polarizing element, as is shown in FIG. 3(c).

FIG. 5(d) shows a liquid crystal display comprising two optical compensatory sheets between a liquid crystal cell of an STN mode and an upper polarizing element, as is shown in FIG. 3(d).

FIG. 5(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 5, the line (X) means a standard direction (0°). The arrows shown in FIG. 5 have the same meanings as is described about FIG. 3. The transparent axis of the lower polarizing element (TAa) and the transparent axis of the upper polarizing element (TAb) can be replaced with each other.

[Transparent Substrate]

A transparent substrate is preferably made of a polymer film, which more preferably is optical isotropic. The term "transparent" means that light transmittance is not less than 80%. The term "optical isotropic" means that a retardation in plane (Re) of the film is not more than 20 nm, preferably not more than 10 nm, and more preferably not more than 5 nm. A retardation along a thickness direction (Rth) of the film is preferably. not more than 100 nm, more preferably not more than 50 nm, and most preferably not more than 30 nm. The Re and Rth retardation values are defined by the following formulas.

$$Re = (nx - ny) \times d$$

$$Rth = [\{(nx+ny)/2\} - nz] \times d$$

in which each of nx and ny is a refractive index in plane of the transparent substrate; nz is a refractive index along a thickness direction of the transparent substrate; and d is a thickness of a transparent substrate.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent substrate has a thickness preferably in the range of 20 to 500 μm, and more preferably in the range of 50 to 200 μm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). An adhesive layer (undercoating layer) can be provided on the transparent substrate.

[Orientation Layer]

According to study of the applicants, discotic liquid crystal molecules can be essentially vertically aligned by a function of a side chain (rather than a main chain) of a polymer contained in an orientation layer. A functional group of the side chain decreases a surface energy of the orientation layer to erect a discotic liquid crystal molecule. A hydrocarbon group containing 10 or more carbon atoms can be effectively used as the functional group. Fluorine atom can also be effectively used as the functional group. The hydrocarbon group or fluorine atom is introduced into a side chain of a polymer to arrange the group or the atom on the surface of the orientation layer.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group. The hydrocarbon group can have a substituent group that is not strongly hydrophilic, such as a halogen atom. The hydrocarbon group contains preferably 10 to 100 carbon atoms, more preferably 10 to 60 carbon atoms, and most preferably 10 to 40 carbon atoms.

The polymer having a hydrocarbon side chain containing 10 or more carbon atoms preferably further has a steroid structure in its side chain or its main chain. The steroid structure present in the side chain is included in the hydrocarbon side chain containing 10 or more carbon atoms. Therefore, the steroid structure in the side chain has a function of aligning discotic liquid crystal molecules essentially vertically. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring).

The fluoropolymer contains fluorine atoms preferably in an amount of 0.05 to 80 wt. %, more preferably in an amount of 0.1 to 70 wt. %, further preferably in an amount of 0.5 to 65 wt. %, and most preferably in an amount of 1 to 60 wt. %.

The polymer of the orientation layer preferably has a main chain of a polyimide structure. The polyimide is usually synthesized by a condensation reaction of a tetracarboxylic acid and diamine. Two or more tetracarboxylic acids or two or more diamines can be used to synthesize a copolymerized polyimide. The hydrocarbon group containing 10 or more carbon atoms can be present in repeating units derived from the tetracarboxylic acids, in repeating units derived from the diamines, or in both of the repeating units. The fluorine atom can also be present in the tetracarboxylic acid repeating units, in the diamine repeating units or in both of the repeating units.

The polymer of the orientation layer-can have a polymerizable group. A polymer having a polymerizable group is used in combination with a discotic liquid crystal molecule having a polymerizable group to chemically bind the polymer and the discotic liquid crystal molecule along an interface between the optical anisotropic layer and the orientation layer. The mechanical strength of the optical compensatory sheet can be improved by the chemical bond.

The polymerizable group of the polymer is determined depending the polymerizable group (Q) of the discotic liquid crystal molecule (described below). The polymerizable group (Q) of the discotic liquid crystal molecule preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6). The polymerizable group of the polymer is also preferably is an unsaturated polymerizable group, an aziridinyl group or an epoxy group, more preferably is an unsaturated polymerizable group, and most preferably is an ethylenically unsaturated group.

The polymerizable group is preferably not directly attached to the main chain of the polymer. In other words, a linking group is preferably present between the main chain and the polymerizable group. Examples of the linking groups include —O—, —O—CO—, —O—CO—NH—, —O—CO—NH-alkylene-, —O—CO—NH-alkylene-O—, —O—CO—NH-alkylene-CO—O—, —O—CO—NH-alkylene-O—CO—, —O—CO—NH-alkylene-CO—NH—, —O—CO-alkylene-O—CO—, —O—CO-arylene-O-alkylene-O—CO—, —O—CO-arylene-O-alkylene-O—, —O—CO-arylene-O-alkylene- and —O-alkylene-O—CO—, in which the left side is attached to the main chain, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group.

The polymer of the orientation layer can two or more polymerizable groups.

Examples of repeating units derived from tetracarboxylic acids (except for nitrogen atom of imide bond, which is derived from diamines) are shown below.

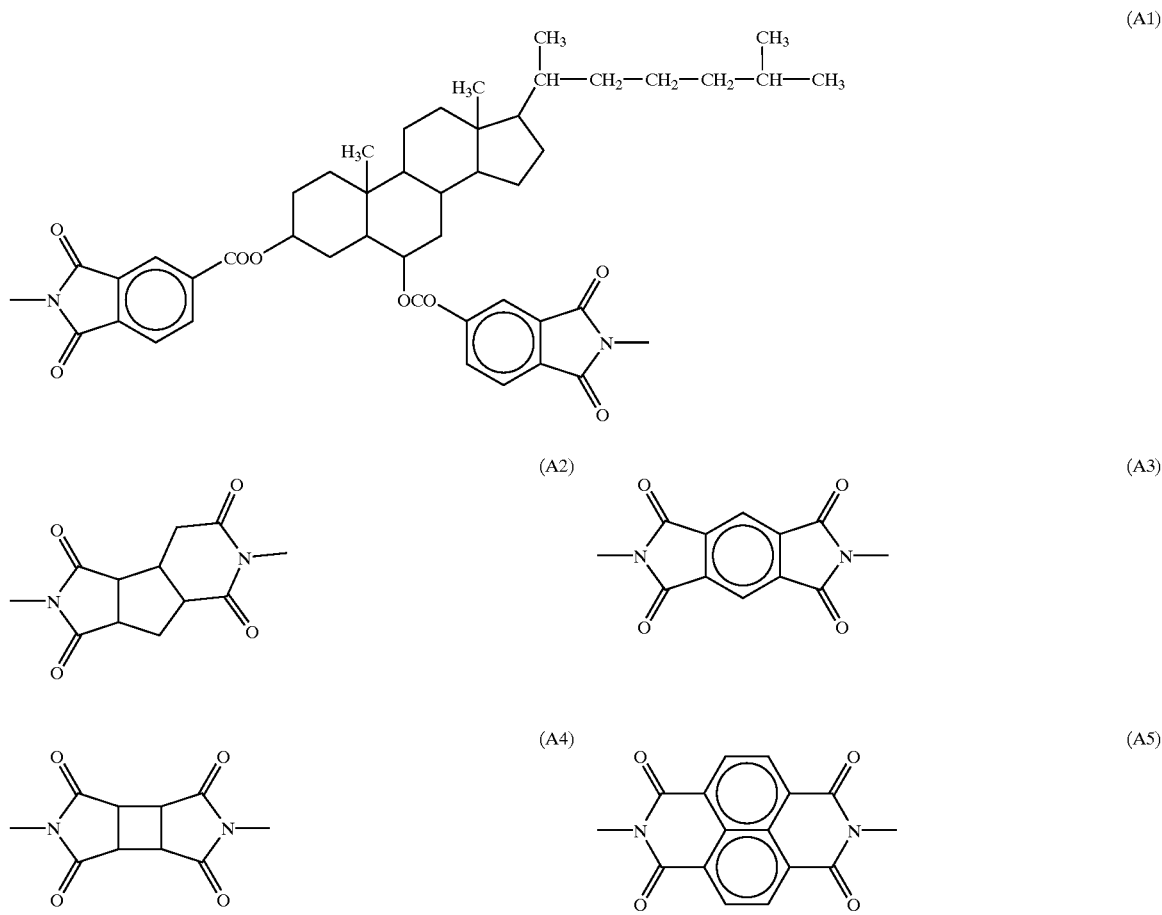

-continued
(A6)
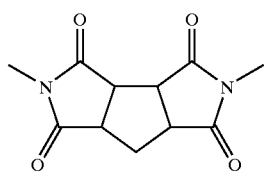
(A7)
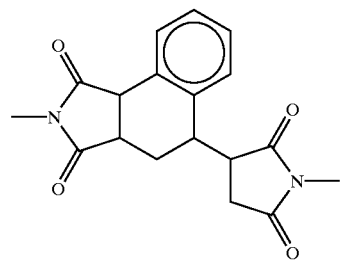
(A8)
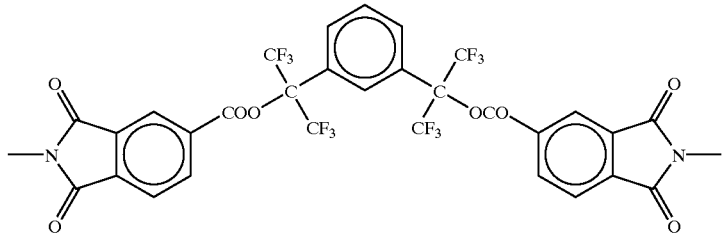
(A9)
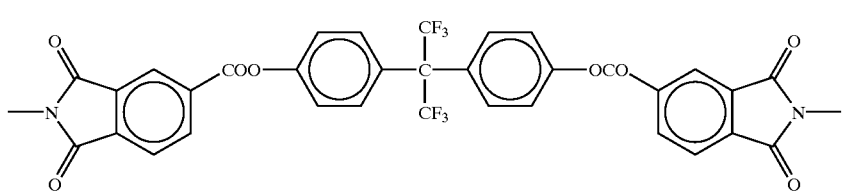
(A10)
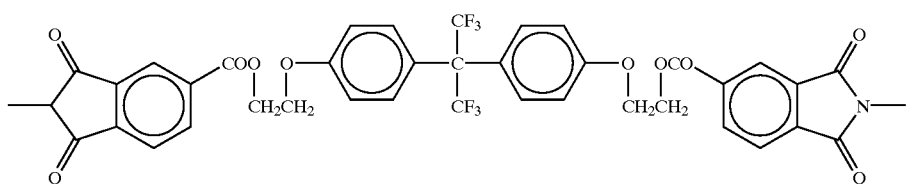
(A11)
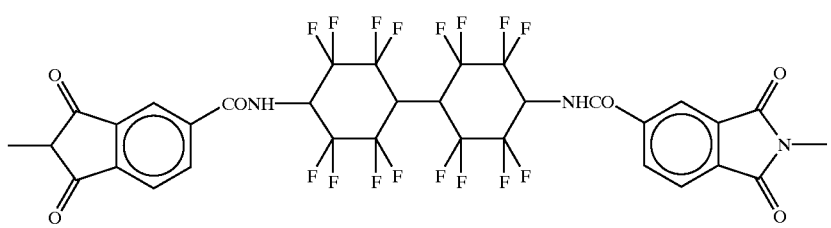
(A12)
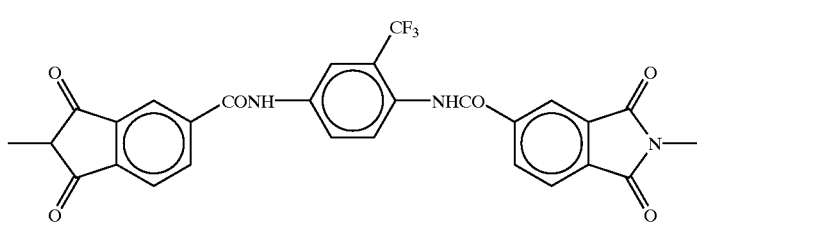
(A13)
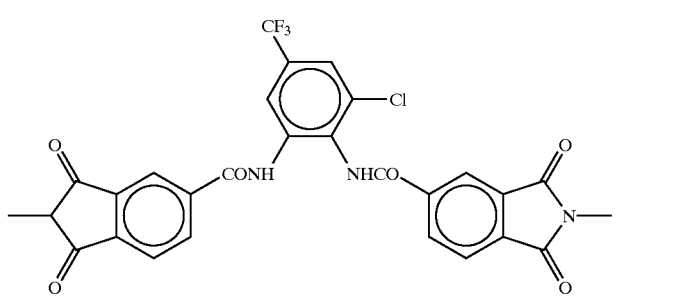

-continued
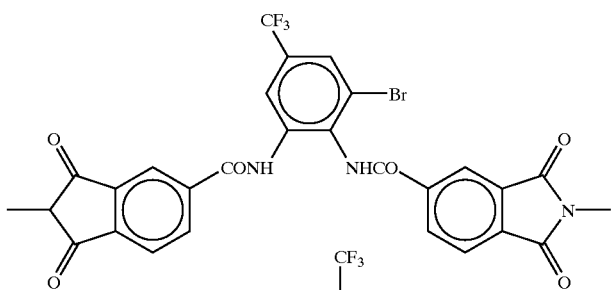
(A14)
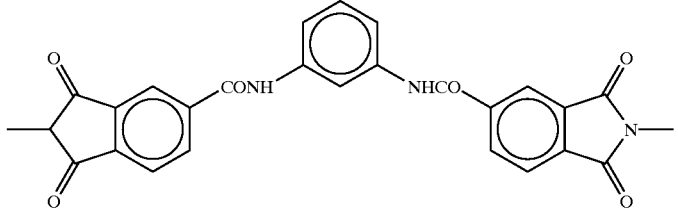
(A15)
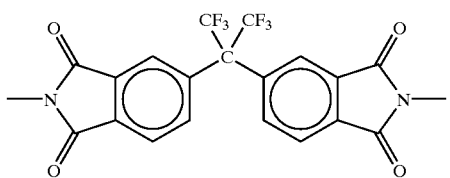
(A16)
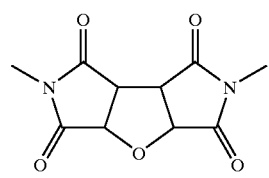
(A17)
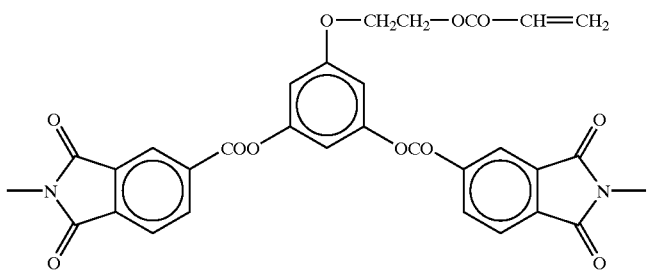
(A18)
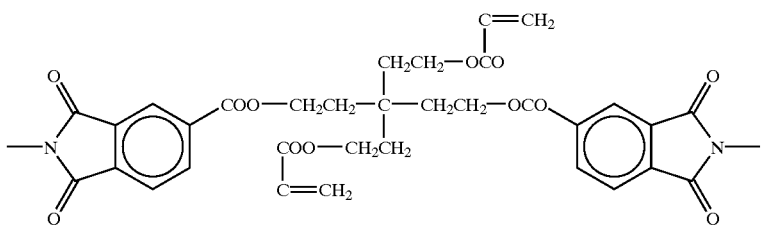
(A19)
Examples of repeating units derived from diamines are shown below.
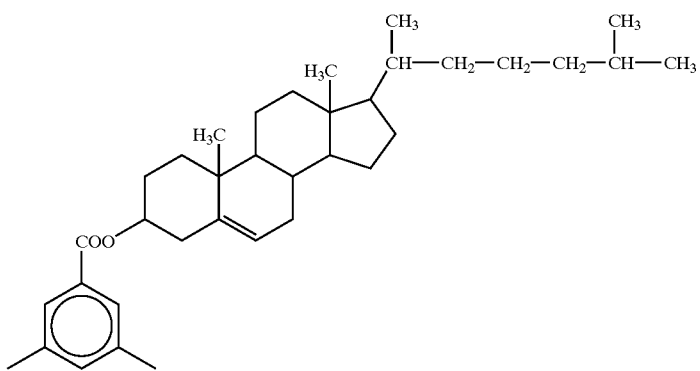
(B1)

(B2)
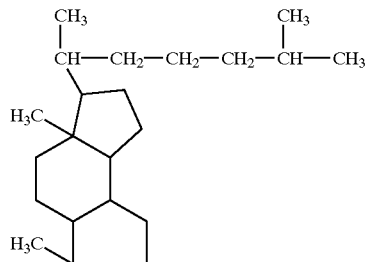
(B3)
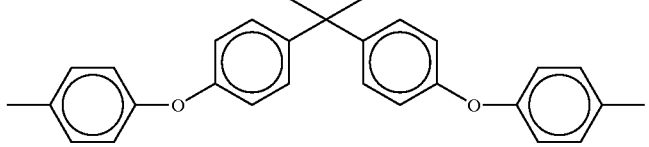
(B4)
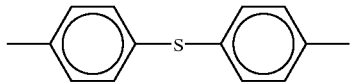
(B5)
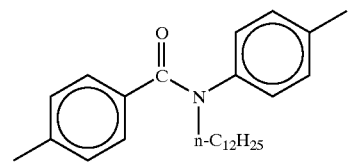
(B6)
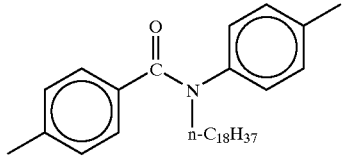
(B7)
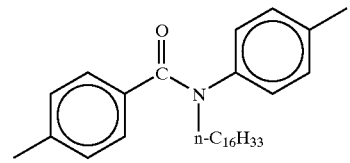
(B8)
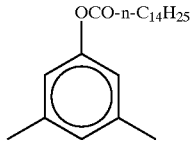
(B9)
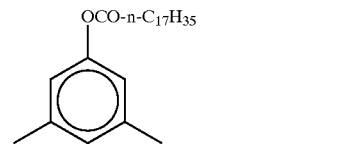
(B10)
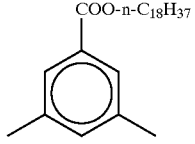
(B11)
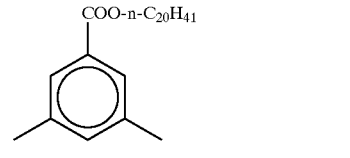
(B12)
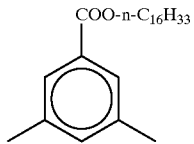
(B13)
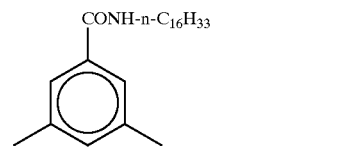
(B14)
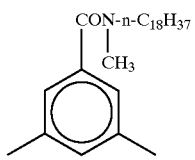
(B15)

-continued
(B16)
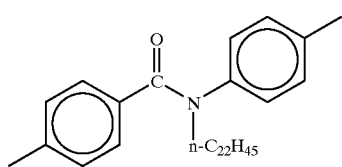
(B17)
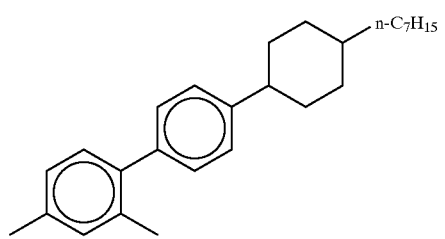
(B18)
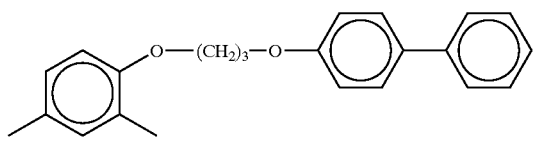
(B19)
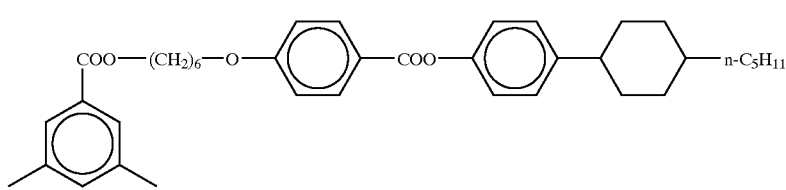
(B20)
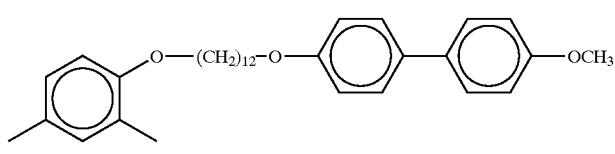
(B21)
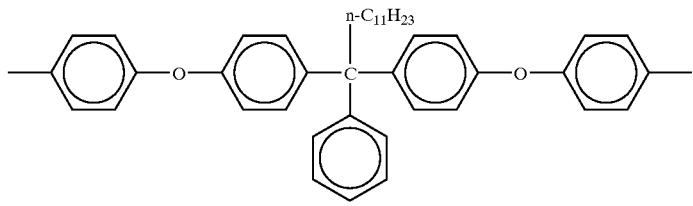
(B22)
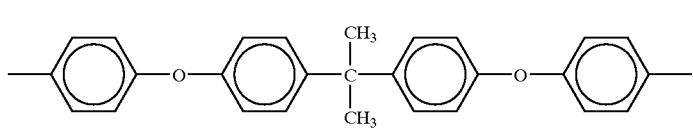
(B23)
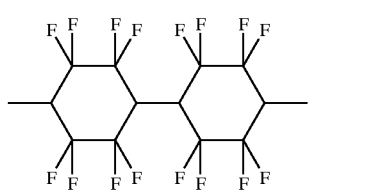
(B24)
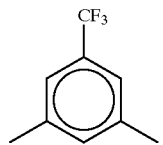
(B25)
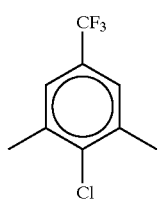
(B26)
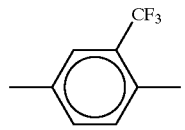
(B27)
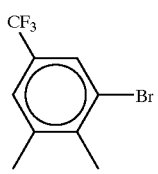
(B28)
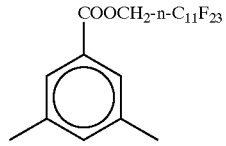

-continued
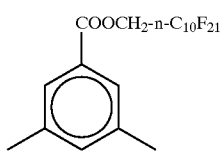
(B29)
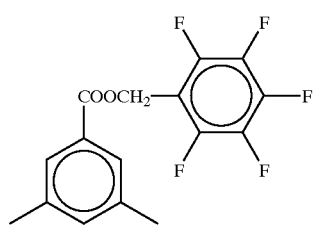
(B30)
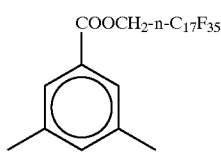
(B31)
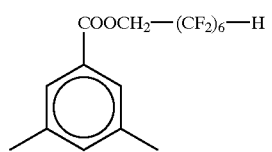
(B32)
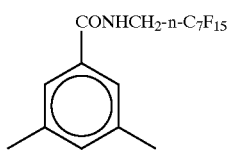
(B33)
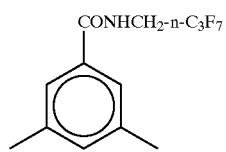
(B34)
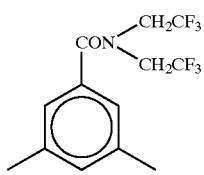
(B35)
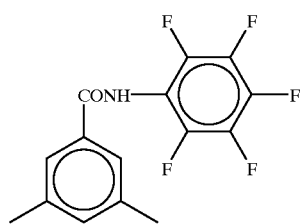
(B36)
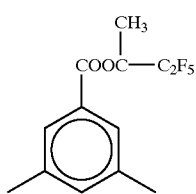
(B37)
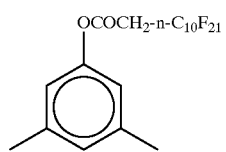
(B38)
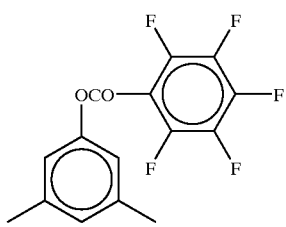
(B39)
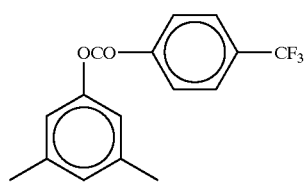
(B40)
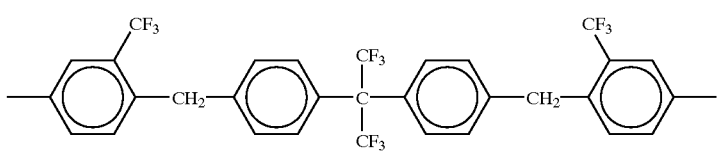
(B41)

-continued
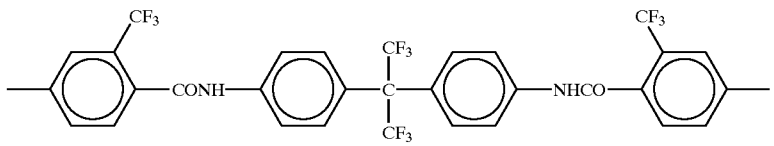
(B42)
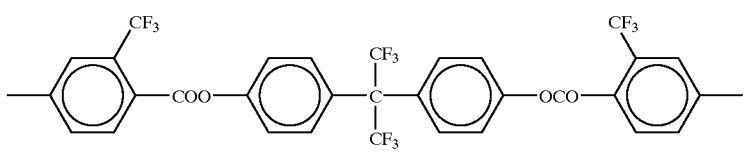
(B43)
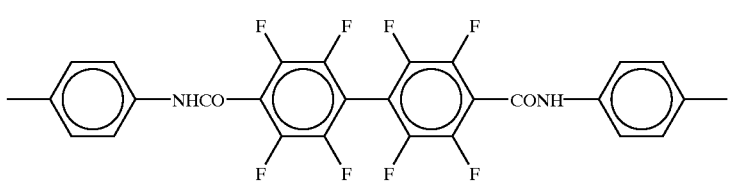
(B44)
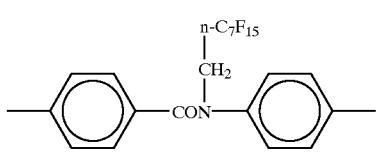
(B45)
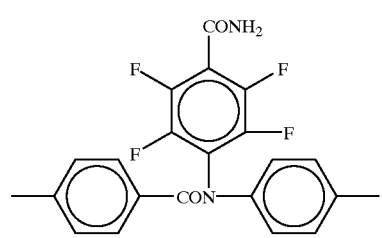
(B46)
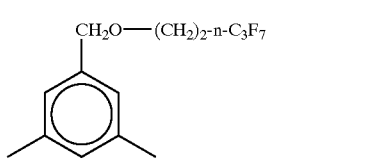
(B47)
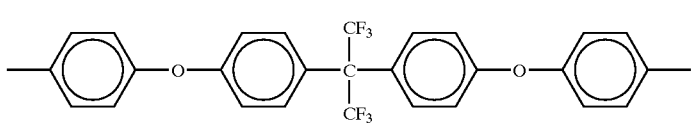
(B48)
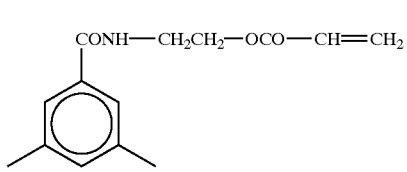
(B49)
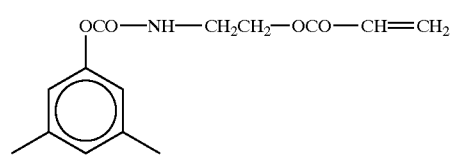
(B50)

A specific group other than the repeating units can be attached to the end of the polyimide. Examples of the end groups are shown below.

(E1)
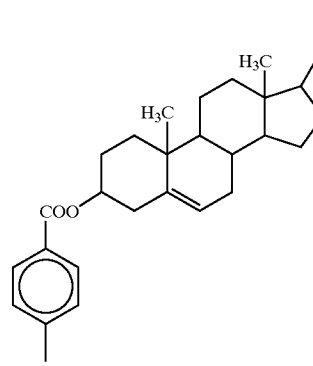

(E2)
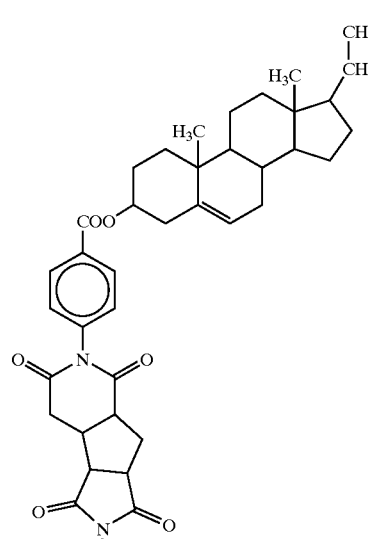

(E3)
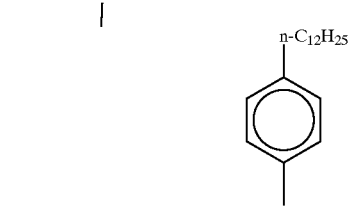

(E4)
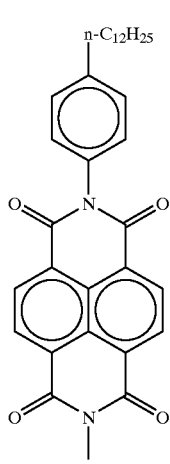

(E5)
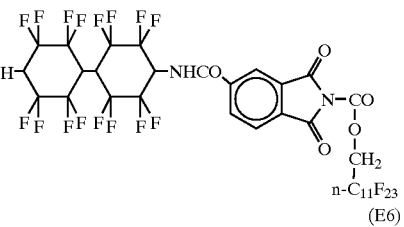

(E6)
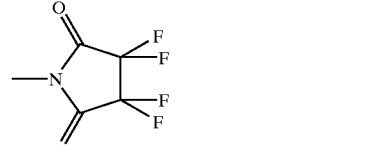

(E7)
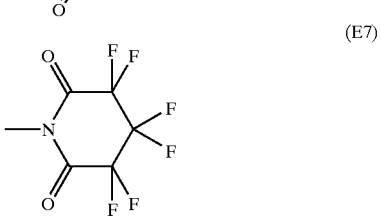

(E8)
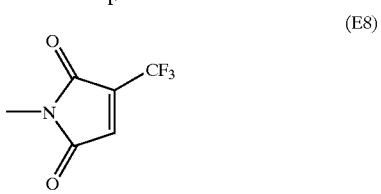

Examples of polyimides having hydrocarbon groups containing 10 or more carbon atoms in their side chains are shown below by referring to the examples of the repeating units derived from tetracarboxylic acids (A), the repeating units derived from diamines (B) and the end groups (E). The ratio of the repeating unit in a copolymer means mol %.

PI1: —A1—B1—
PI2: —(A1—B1)$_{80}$—(A1—B2)$_{20}$—
PI3: —(A2—B1)$_{50}$—(A1—B1)$_{50}$—
PI4: —A2—B3—
PI5: —(A2—B3)$_{90}$—(A2—B2)$_{10}$—
PI6: —A3—B1—
PI7: —(A2—B1)$_{40}$—(A2—B4)$_{60}$—
PI8: —A2—B5—
PI9: —(A2—B5)$_{85}$—(A2—B2)$_{15}$—
PI10: —A4—B6—
PI11: —(A3—B7)$_{50}$—(A4—B7)$_{50}$—
PI12: —A2—B8—
PI13: —(A3—B9)$_{75}$—(A4—B9)$_{25}$—
PI14: —A3—B10—
PI15: —(A5—B11)$_{85}$—(A5—B12)$_{15}$—
PI16: —(A2—B13)$_{60}$—(A5—B13)$_{40}$—
PI17: —A2—B14—
PI18: —(A2—B14)$_{30}$—(A3—B14)$_{30}$—(A2—B12)$_{20}$—(A3—B12)$_{20}$—
PI19: E1—(A2—B15)—E2
PI20: E3—(A5—B5)—E4
PI21: —(A2—B1)$_{65}$—(A2—B2)$_{35}$—
PI22: —A6—B16—
PI23: —A4—B17—

PI24: —(A4—B18)$_{40}$—(A3—B18)$_{60}$—
PI25: —A4—B19—
PI26: —A4—B20—
PI27: —A7—B21—
PI28: —A4—B22—

Examples of polyimides containing fluorine atoms are shown below by referring to the examples of the repeating units derived from tetracarboxylic acids (A), the repeating units derived from diamines (B) and the end groups (E). The ratio of the repeating unit in a copolymer means mol %.

PI31: —A8—B23—
PI32: —A9—B24—
PI33: —A10—B25—
PI34: —A11—B23—
PI35: —A12—B23—
PI36: —(A13—B26)$_{90}$—(A13—B2)$_{10}$—
PI37: —(A13—B26)$_{80}$—(A13—B2)$_{20}$—
PI38: —(A13—B26)$_{65}$—(A13—B2)$_{35}$—
PI39: —(A11—B27)—E5
PI40: —A8—B28—
PI41: —(A8—B29)$_{60}$—(A8—B26)$_{40}$—
PI42: —(A8—B29)$_{50}$—(A8—B26)$_{50}$—
PI43: —(A8—B29)$_{25}$—(A8—B26)$_{75}$—
PI44: —(A9—B30)$_{95}$—(A3—B30)$_{5}$—
PI45: —(A9—B30)$_{64}$—(A3—B30)$_{36}$—
PI46: —(A9—B30)$_{45}$—(A3—B30)$_{55}$—
PI47: —A9—B31—
PI48: —(A14—B32)$_{70}$—(A2—B32)$_{30}$—
PI49: —(A14—B32)$_{55}$—(A2—B32)$_{45}$—
PI50: —(A14—B32)$_{20}$—(A2—B32)$_{80}$—
PI51: —(A15—B33)$_{78}$—(A15—B34)$_{22}$—
PI52: —(A15—B33)$_{63}$—(A15—B34)$_{37}$—
PI53: —(A15—B33)$_{22}$—(A15—B34)$_{78}$—
PI54: —(A16—B35)$_{67}$—(A2—B36)$_{33}$—
PI55: —(A16—B35)$_{50}$—(A2—B36)$_{50}$—
PI56: —(A16—B35)$_{22}$—(A2—B36)$_{78}$—
PI57: —(A16—B37)$_{85}$—(A16—B2)$_{15}$—
PI58: —(A16—B37)$_{98}$—(A16—B2)$_{2}$—
PI59: —(A16—B37)$_{64}$—(A16—B2)$_{36}$—
PI60: —(A16—B38)$_{99}$—(A4—B38)$_{1}$—
PI61: —(A16—B38)$_{81}$—(A4—B38)$_{19}$—
PI62: —(A16—B38)$_{51}$—(A4—B38)$_{49}$—
PI63: —(A9—B39)$_{30}$—(A2—B39)$_{70}$—
PI64: —(A9—B39)$_{55}$—(A2—B39)$_{45}$—
PI65: —(A9—B39)$_{1}$—(A2—B39)$_{99}$—
PI66: —(A16—B40)—E6
PI67: —A2—B41—
PI68: —A3—B42—
PI69: —A4—B42—
PI70: —A2—B44—
PI71: —(A2—B45)$_{70}$—(A2—B2)$_{30}$—
PI72: —(A2—B45)$_{56}$—(A2—B2)$_{44}$—
PI73: —(A2—B45)$_{44}$—(A2—B2)$_{56}$—
PI74: —(A6—B46)$_{60}$—(A17—B46)$_{40}$—
PI75: —(A6—B46)$_{50}$—(A17—B46)$_{50}$—
PI76: —(A6—B46)$_{40}$—(A17—B46)$_{60}$—
PI77: —(A4—B47)$_{90}$—(A4—B22)$_{10}$—
PI78: —(A4—B47)$_{99}$—(A4—B22)$_{1}$—
PI79: —(A4—B47)$_{75}$—(A4—B22)$_{25}$—
PI80: —(A4—B48)—E7
PI81: —(A8—B23)—E8

A polyamic acid having a hydrocarbon group containing 10 or more carbon atoms in its side chain or a polyamic acid containing fluorine atom can also be used as a polymer of the orientation layer. The polyamic acid is synthesized by a partial condensation reaction of a tetracarboxylic acid and diamine. The amide bond of the polyamic acid is formed by a reaction of two of the four carboxyl groups of the tetracarboxylic acid with the diamine. The other two carboxylic groups of the tetracarboxylic acid remains in the formed polyamic acid.

The polyamic acid itself can function as an orientation layer. The polyamic acid can be dehydrated by heating to cause a ring closing reaction and to form a polyimide, which can be used as the orientation layer. The polyamic acid can be partially dehydrated by heating at a low temperature or for a short time to cause a ring closing reaction and to form a copolymer of a polyamic acid and a polyimide, which can also be used as the orientation layer.

The polymer used in the orientation layer has a polymerization degree preferably in the range of 200 to 5,000, and more preferably in the range of 300 to 3,000. The polymer has a molecular weight preferably in the range of 9,000 to 200,000, and more preferably in the range of 13,000 to 130,000.

Two or more polymers can be used in combination.

The polymer used in the orientation layer can have a cross-linked structure. The cross-linking reaction is preferably conducted simultaneously with or after coating a solution of the orientation layer on a transparent substrate.

The polymer can be cross-linked by using a cross-linking agent. Examples of the cross-linking agents include an epoxy compound (e.g., glycerol polyglycidyl ether, polyglycerol polyglycidyl ether, polyethylene glycol diglycidyl ether), an aldehyde (e.g., formaldehyde, glyoxal, glutaraldehyde, malonaldehyde, phthalaldehyde, terephthalaldehyde, succinaldehyde, isophthalaldehyde, dialdehyde starch), a dioxane (e.g., 2,3-dihydroxydioxane), a carbenium, 2-naphthalate sulfonate, 1,1-bispyrrolidino-1-chloropyridinium, 1-morphorinocarbonyl-3-sulfonatoaminomethyl, an active vinyl compound (e.g., 1,3,5-triacryloyl-hexahydro-s-triazine, bis(vinylsulfone) methane, N,N'-methylenebis-[b-(vinylsulfonyl) propionamide), an active halogen compound (e.g., 2,4-dichloro-6-hydroxy-s-triazine) and an isooxazole. In the case that the polymer is a polyamide or a polyamic acid, the epoxy compound is preferably used as the cross-linking agent.

The orientation layer has a thickness preferably in the range of 0.1 to 10 μm.

The orientation layer is preferably formed by rubbing the polymer. The rubbing treatment can be conducted by rubbing a layer containing the polymer with a paper or cloth several times along a certain direction.

After aligning discotic liquid crystal compounds of the optically anisotropic layer by the orientation layer, the alignment of the discotic compounds can be kept without the orientation layer. The aligned optically anisotropic layer (without the orientation layer) can be transferred on a transparent substrate to prepare an optical compensatory sheet.

[Optically Anisotropic Layer]

The optically anisotropic layer comprises discotic liquid crystal molecules.

In the optically anisotropic layer, discotic planes of discotic liquid crystal molecules are aligned essentially vertically to the orientation layer (at an average inclined angle in the range of 50° to 90°). The discotic liquid crystal molecules are preferably fixed in the optical anisotropic layer while keeping the vertical (homogeneous) alignment. The discotic liquid crystal molecules are preferably fixed by a polymerization reaction.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula.

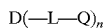

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

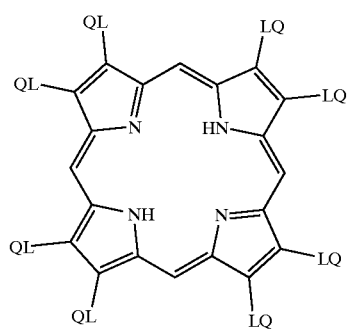

(D1)

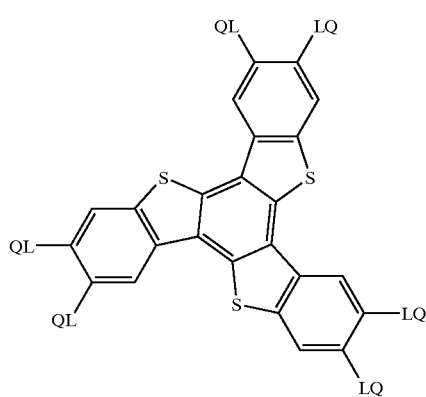

(D2)

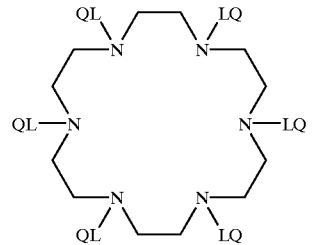

(D3)

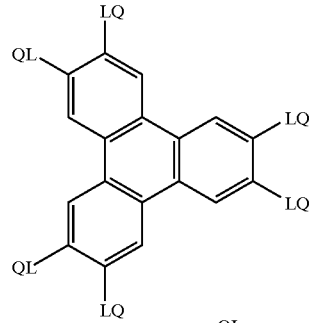

(D4)

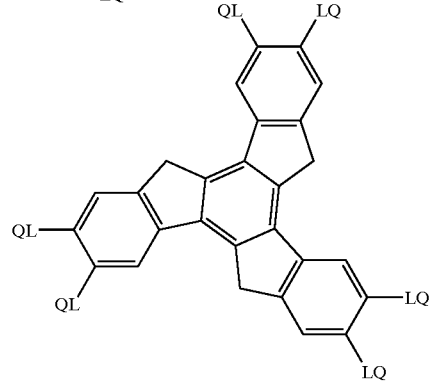

(D5)

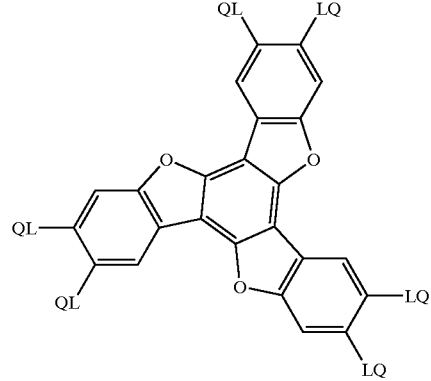

(D6)

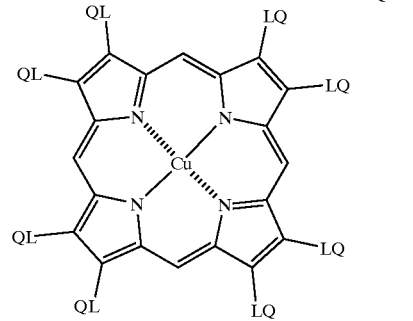

(D7)

-continued
(D8)
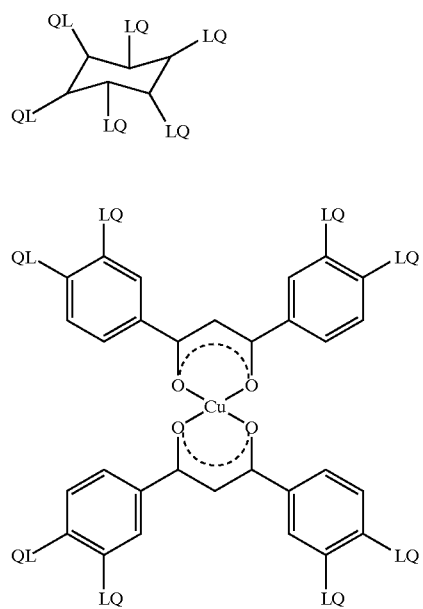
(D9)
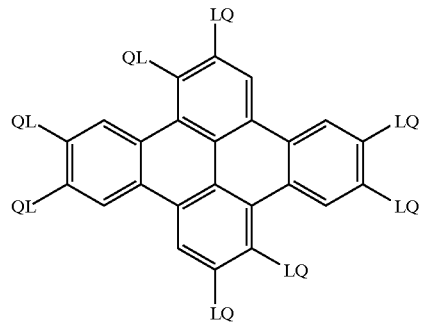
(D10)
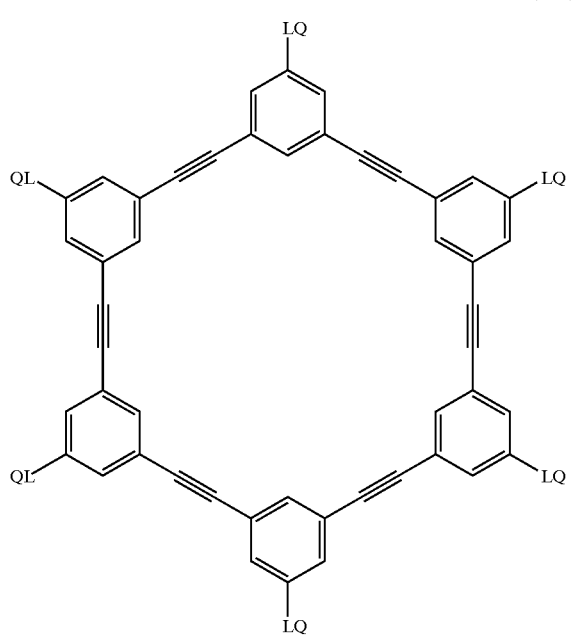
(D11)
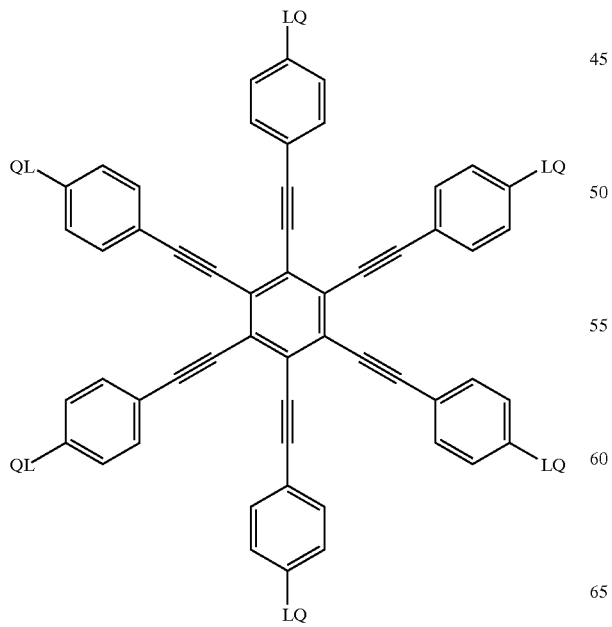
-continued
(D12)
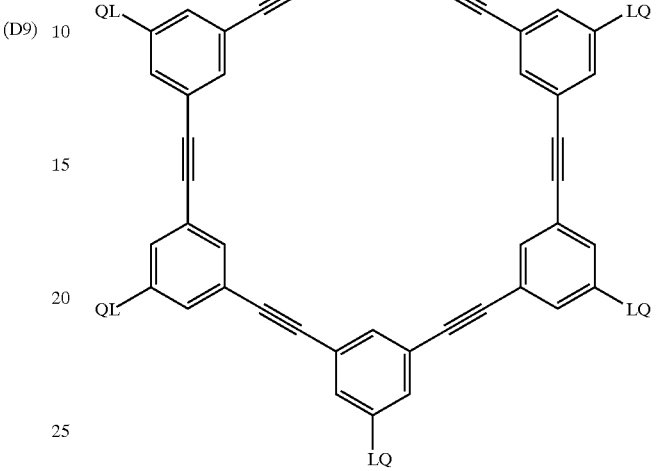
(D13)
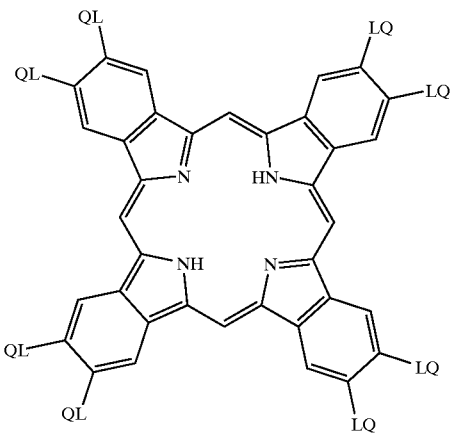
(D14)
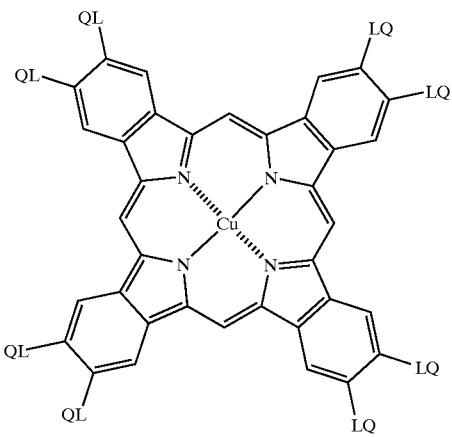

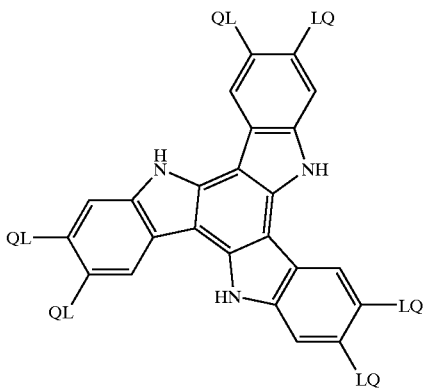

(D15)

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—O—CO—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The discotic liquid crystal molecules can be spirally twisted by introducing asymmetric carbon atom into the molecules, preferably into AL (an alkylene group or an alkenylene group) of the divalent linking group (L). Examples of AL* containing asymmetric carbon atoms are shown below. In the examples, the left side is adjacent to the discotic core (D), and the right side is adjacent to the polymerizable group (Q). The carbon atom (C) with the mark (*) is the asymmetric carbon atom. The optical activity can be S or R.

AL*1: —$CH_2CH_2$—C*$HCH_3$—$CH_2CH_2CH_2$—
AL*2: —$CH_2CH_2CH_2$—C*$HCH_3$—$CH_2CH_2$—
AL*3: —$CH_2$—C*$HCH_3$—$CH_2CH_2CH_2CH_2$—
AL*4: —C*$HCH_3$—$CH_2CH_2CH_2CH_2CH_2$—
AL*5: —$CH_2CH_2CH_2CH_2$—C*$HCH_3$—$CH_2$—
AL*6: —$CH_2CH_2CH_2CH_2CH_2$—C*$HCH_3$—
AL*7: —C*$HCH_3$—$CH_2CH_2CH_2CH_2$—
AL*8: —$CH_2$—C*$HCH_3$—$CH_2CH_2CH_2$—
AL*9: —$CH_2CH_2$—C*$HCH_3$—$CH_2CH_2$—
AL*10: —$CH_2CH_2CH_2$—C*$HCH_3$—$CH_2$—
AL*11: —$CH_2CH_2CH_2CH_2$—C*$HCH_3$—
AL*12: —C*$HCH_3$—$CH_2CH_2CH_2$—
AL*13: —$CH_2$—C*$HCH_3$—$CH_2CH_2$—
AL*14: —$CH_2CH_2$—C*$HCH_3$—$CH_2$—
AL*15: —$CH_2CH_2CH_2$—C*$HCH_3$—
AL*16: —$CH_2$—C*$HCH_3$—
AL*17: —C*$HCH_3$—$CH_2$—
AL*18: —C*$HCH_3$—$CH_2CH_2CH_2CH_2CH_2CH_2$—
AL*19: —$CH_2$—C*$HCH_3$—$CH_2CH_2CH_2CH_2CH_2$—
AL*20: —$CH_2CH_2$—C*$HCH_3$—$CH_2CH_2CH_2CH_2$—
AL*21: —$CH_2CH_2CH_2$—C*$HCH_3$—$CH_2CH_2CH_2$—
AL*22: —C*$HCH_3$—$CH_2CH_2CH_2CH_2CH_2CH_2CH_2$—
AL*23: —$CH_2$—C*$HCH_3$—$CH_2CH_2CH_2CH_2CH_2CH_2$—
AL*24: —$CH_2CH_2$—C*$HCH_3$—$CH_2CH_2CH_2CH_2CH_2$—
AL*25: —$CH_2CH_2CH_2$—C*$HCH_3$—$CH_2CH_2CH_2CH_2$—
AL*26: —C*$HCH_3$—$CH_2CH_2CH_2CH_2CH_2CH_2CH_2CH_2$—
AL*27: —$CH_2$—C*$HCH_3$—$CH_2CH_2CH_2CH_2CH_2CH_2CH_2$—
AL*28: —$CH_2$—C*$HCH_2CH_3$—
AL*29: —$CH_2$—C*$HCH_2CH_3$—$CH_2$—
AL*30: —$CH_2$—C*$HCH_2CH_3$—$CH_2CH_2$—
AL*31: —$CH_2$—C*$HCH_2CH_3$—$CH_2CH_2CH_2CH_2$—
AL*32: —$CH_2$—C*$H(n-C_3H_7)$—$CH_2CH_2$—
AL*33: —$CH_2$—C*$H(n-C_3H_7)$—$CH_2CH_2CH_2CH_2$—
AL*34: —$CH_2$—C*$H(OCOCH_3)$—$CH_2CH_2$—
AL*35: —$CH_2$—C*$H(OCOCH_3)$—$CH_2CH_2CH$
AL*36: —$CH_2$—C*HF—$CH_2CH_2$—
AL*37: —$CH_2$—C*HF—$CH_2CH_2CH_2CH_2$—
AL*38: —$CH_2$—C*HCl—$CH_2CH_2$—
AL*39: —$CH_2$—C*HCl—$CH_2CH_2CH_2CH_2$—
AL*40: —$CH_2$—C*$HOCH_3$—$CH_2CH_2$—
AL*41: —$CH_2$—C*$HOCH_3$—$CH_2CH_2CH_2CH_2$—

AL*42: —CH₂—C*HCN—CH₂CH₂—
AL*43: —CH₂—C*HCN—CH₂CH₂CH₂CH₂—
AL*44: —CH₂—C*HCF₃—CH₂CH₂—
AL*45: —CH₂—C*HCF₃—CH₂CH₂CH₂CH₂—

The polymerizable group (Q) is determined by the polymerization reaction. Examples of the polymerizable groups (Q) are shown below.

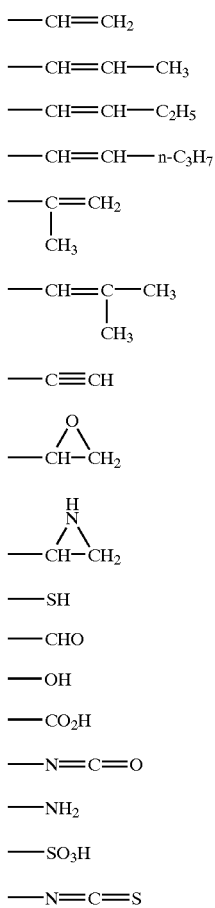

(Q1) —CH=CH₂
(Q2) —CH=CH—CH₃
(Q3) —CH=CH—C₂H₅
(Q4) —CH=CH—n-C₃H₇
(Q5) —C(CH₃)=CH₂
(Q6) —CH=C(CH₃)—CH₃
(Q7) —C≡CH
(Q8) —CH−CH₂ (epoxy)
(Q9) —CH−CH₂ (aziridinyl, NH)
(Q10) —SH
(Q11) —CHO
(Q12) —OH
(Q13) —CO₂H
(Q14) —N=C=O
(Q15) —NH₂
(Q16) —SO₃H
(Q17) —N=C=S The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined by the chemical structure of the discotic core (D). The 4 to 12 combinations of L and Q can be different from each other. However, the combinations are preferably identical.

Two or more discotic liquid crystal molecules can be used in combination. For example, a molecule containing asymmetric carbon atom in the divalent linking group (L) can be used in combination with a molecule containing no asymmetric carbon atom. Further, a molecule having a polymerizable group (Q) can be used in combination with a molecule having no polymerizable group. A molecule containing asymmetric carbon atom and having no polymerizable group is preferably used in combination with a molecule having a polymerizable group and containing no asymmetric carbon atom. The last combination can also be considered that only a molecule having a polymerizable group and containing no asymmetric carbon atom functions as a discotic liquid crystal molecule, while a molecule containing asymmetric carbon atom and having no polymerizable group functions as a chiral agent (described below).

The discotic liquid crystal molecule having no polymerizable group is obtained by replacing the polymerizable group (Q) of the above-described polymerizable discotic liquid crystal molecule with hydrogen or an alkyl group. Accordingly, the discotic liquid crystal molecule having no polymerizable group preferably is a compound represented by the following formula.

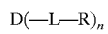

D(—L—R)ₙ in which D is a discotic core; L is a divalent linking group; R is hydrogen or an alkyl group; and n is an integer of 4 to 12.

Examples of the discotic cores are the same as the examples of the cores in the polymerizable discotic liquid crystal molecule, except that LQ or QL is replaced with LR or RL.

Examples of the divalent linking groups are also the same as the examples of the linking groups in the polymerizable discotic liquid crystal molecule.

The alkyl group of R contains preferably 1 to 40 carbon atoms, and more preferably 1 to 30 carbon atoms. An alkyl group preferably has a chain structure rather than a cyclic structure. An alkyl group having a straight chain (normal alkyl group) is preferred to a branched alkyl group. R preferably is hydrogen or a normal alkyl group having 1 to 30 carbon atoms.

In place of introducing asymmetric carbon atom into the divalent linking group of the discotic liquid crystal molecule, the discotic liquid crystal molecules can also be spirally twisted by adding an optical active compound containing asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

The optically anisotropic layer can further contain a fluorine containing surface active agent or a cellulose ester, which has a function of uniformly and essentially vertically (homogeneously) aligning discotic liquid crystal molecules placed near an interface between the layer and the air.

The fluorine containing surface active agent comprises a hydrophobic group containing fluorine, a nonionic, anionic, cationic or amphoteric hydrophilic group and an optional linking group.

The fluorine containing surface active agent comprising one hydrophobic group and one hydrophilic group is represented by the following formula.

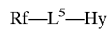

Rf—L⁵—Hy in which Rf is a monovalent hydrocarbon group substituted with fluorine; L⁵ is a single bond or divalent linking group; and Hy is a hydrophobic group.

Rf in the formula functions as a hydrophobic group. The hydrocarbon group preferably is an alkyl group or an aryl group. The alkyl group preferably has 3 to 30 carbon atoms. The aryl group preferably has 6 to 30 carbon atoms.

All or a part of hydrogen atoms contained in the hydrocarbon group is substituted with fluorine. At least 50% of hydrogen atomss are preferably substituted with fluorine. More preferably at least 60%, further preferably at least 70%, and most preferably at least 80% of hydrogen atoms are substituted with fluorine.

The other hydrogens may be substituted with other halogen atoms (e.g., chlorine, bromine).

Examples of Rf are shown below.

Rf1: n—$C_8F_{17}$—
Rf2: n—$C_6F_{13}$—
Rf3: Cl—$(CF_2—CFCl)_3$—$CF_2$—
Rf4: H—$(CF_2)_8$—
Rf5: H—$(CF_2)_{10}$—
Rf6: n—$C_9F_{19}$—
Rf7: Pentafluorophenyl
Rf8: n—$C_7F_{15}$—
Rf9: Cl—$(CF_2—CFCl)_2$—$CF_2$—
Rf10: H—$(CF_2)_4$—
Rf11: H—$(CF_2)_6$—
Rf12: Cl—$(CF_2)_6$—
Rf13: $C_3F_7$—

In the formula, the divalent linking group is preferably selected from the group consisting of an alkylene group, an arylene group, a divalent heterocyclic group, —CO—, —NR— (in which R is hydrogen or an alkyl group having 1 to 5 carbon atoms), —O—, —$SO_2$— and a combination thereof.

Examples of $L^4$ in the formula are shown below. In the following examples, the left side is attached to a hydrophobic group (Rf) and the right side is attached to a hydrophilic group (Hy). AL means an alkylene group, AR means an arylene group, and Hc means a heterocyclic group. The alkylene group, the arylene group and the heterocyclic group may have a substituent group (e.g., an alkyl group).

L0: a single bond
L51: —$SO_2$—NR—
L52: —AL—O—
L53: —CO—NR—
L54: —AR—O—
L55: —$SO_2$—NR—AL—CO—O—
L56: —CO—O—
L57: —$SO_2$—NR—AL—O—
L58: —$SO_2$—NR—AL—
L59: —CO—NR—AL—
L60: —$AL^1$—O—$AL^2$—
L61: —Hc—AL—
L62: —$SO_2$—NR—$AL^1$—O—$AL^2$—
L63: —AR—
L64: —O—AR—$SO_2$—NR—AL—
L65: —O—AR—$SO_2$—NR—
L66: —O—AR—O—

Hy in the formula is a nonionic hydrophilic group, an anionic hydrophilic group, a cationic hydrophilic group or a combination thereof (an amphoteric hydrophilic group). A nonionic hydrophilic group is particularly preferred.

Examples of Hy are shown below.

Hy1: —$(CH_2CH_2O)_n$—H (n: an integer of 5 to 30)
Hy2: —$(CH_2CH_2O)_n$—$R^1$ (n: an integer of 5 to 30, $R^1$: an alkyl group having 1 to 6 carbon atoms)
Hy3: —$(CH_2CHOHCH_2)_n$—H (n: an integer of 5 to 30)
Hy4: —COOM (M: hydrogen, an alkali metal atom or dissociated)
Hy5: —$SO_3M$ (M: hydrogen, an alkali metal atom or dissociated)
Hy6: —$(CH_2CH_2O)_n$—$CH_2CH_2CH_2$—$SO_3M$ (n: an integer of 5 to 30, M; hydrogen or an alkali metal atom)
Hy7: —$OPO(OH)_2$
Hy8: —$N^+(CH_3)_3.X^-$ (X: a halogen atom)
Hy9: —$COONH_4$ The nonionic hydrophilic groups (Hy1, Hy2, Hy3) are preferred, and the hydrophilic group consisting of polyethylene oxide (Hy1) is particularly preferred.

The fluorine containing surface active agent may have two or more hydrophobic groups containing fluorine or two or more hydrophilic groups. Two or more fluorine containing surface active agents can be used in combination.

The surface active agents are described in various documents, such as Hiroshi Horiguchi, New Surface Active Agents, Sankyo Shuppan, 1975 (written in Japanese), M. J. Schick, Nonionic Surfactants, Marcell Dekker Inc., New York, 1967 and Japanese Patent Provisional Publication No. 7(1995) -13293.

The fluorine containing surface active agent is used in an amount of 0.01 to 30 wt. % based on the amount of the discotic liquid crystal molecules. The amount is preferably in the range of 0.05 to 10 wt. %, and more preferably in the range of 0.1 to 5 wt. %.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per $m^2$, more preferably in the range of 0.01 to 0.45 g per $m^2$, further preferably in the range of 0.02 to 0.4 g per $m^2$, and most preferably in the range of 0.03 to 0.35 g per $m^2$. The amount of the cellulose ester is also preferably in the range of 0.1 to 5 wt. % based on the amount of the discotic liquid crystal molecule.

An optically anisotropic layer can be formed by coating a solution containing the discotic liquid crystal molecule and optional components such as the chiral agent, the above-mentioned additive (a fluorine containing surface active agent, a cellulose ester), a polymerization initiator (described below) on an orientation layer.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are preferably fixed while keeping the essentially vertical (homogeneous) alignment. The discotic liquid crystal molecules are fixed preferably by a polymerization reaction of the polymerizable groups (Q) in the molecules. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 5,000 mJ per $cm^2$, and more preferably in the range of 100 to 800 mJ per $cm^2$. The light irradiation can be conducted while heating the layer to accelerate the photo polymerization reaction.

The optically anisotropic layer has a thickness preferably in the range of 0.1 to 50 μm, more preferably 1 to 30 μm, and most preferably in the range of 5 to 20 μm. In the case that two optical compensatory sheets are used in a liquid crystal display, the preferred thickness of the layer is half of the preferred thickness (described above) in the case that one optical compensatory sheet is used in a liquid crystal display.

The discotic liquid crystal molecules in the optically anisotropic layer are aligned at an average inclined angle in the range of 50° to 90°. The inclined angle is preferably uniform. However, the inclined angle can be changed if the angle is continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 900 to 1800. In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

[Liquid Crystal Display]

The present invention is particularly effective in a liquid crystal display of an STN mode.

The liquid crystal display of an STN mode comprises a liquid crystal cell of an STN mode, two polarizing elements arranged on each side of the liquid crystal cell, and one or two optical compensatory sheets arranged between the liquid crystal cell and the polarizing element.

The alignment of rod-like liquid crystal molecule in the liquid crystal cell and the alignment of the discotic liquid crystal molecules in the optical compensatory sheet is preferably so adjusted that a director of a rod-like liquid crystal molecule adjacent to the optical compnesatory sheet is the essentially same direction of a director of the discotic liquid crystal molecule adjacent to the liquid crystal cell. The director of the rod-like liquid crystal molecule means the direction of the long axis of the rod-like molecule. The director of the discotic liquid crystal molecule means the direction of a normal line of the discotic core plane. The essentially same direction means that the angle between the directors viewed along a normal line of the liquid crystal cell.

The transparent substrate of the optical compensatory sheet can be used as a protective film of a polarizing plate (on the side facing the liquid crystal cell). In this case, a slow axis (direction showing the maximum refractive index) of the transparent substrate is preferably so arranged that the slow axis is essentially perpendicular or parallel to the transmission axis (direction showing the maximum transmittance) of the polarizing plate. The term "essentially perpendicular or parallel" means that a margin for error based on the exact angle is in the range of ±10°.

EXAMPLE 1

A triacetyl cellulose film (thickness: 100 μm, size: 270 mm×100 mm, Fuji Tac, Fuji Photo Film Co., Ltd.) was used as a transparent substrate.

A polyimide PI1 having a hydrocarbon group in its side chain was dissolved in a mixture of methanol and acetone (volume ratio: 50/50) to prepare a 5 wt. % solution. The solution was coated on the transparent substrate by using a bar coater (thickness: 1 μm), and air-dried at 130° C. for 2 minutes. The surface was subjected to a rubbing treatment to form an orientation layer.

The following coating solution was coated on the orientation layer according to an extrusion method.

| Coating solution for optically anisotropic layer | |
|---|---|
| The following discotic liquid crystal compound (1) | 80 weight parts |
| The following discotic liquid crystal compound (2) | 20 weight parts |
| The following fluorine containing surface active agent | 0.1 weight part |

| -continued |  |
|---|---|
| Coating solution for optically anisotropic layer | |
| A photopolymerization initiator (Irgacure 907, Ciba-Geigy) | 0.2 weight part |
| Methyl ethyl ketone | 185 weight parts |

Discotic liquid crystal compound (1)

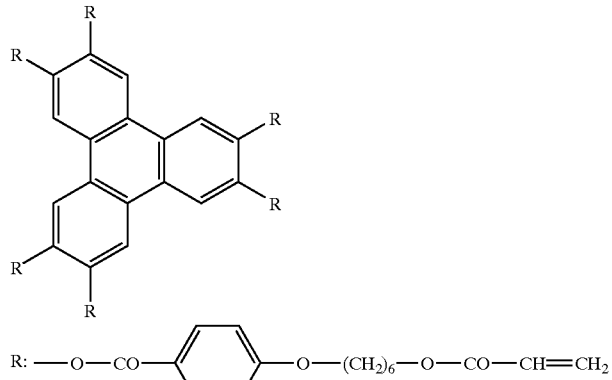

R: —O—CO—⟨C6H4⟩—O—(CH₂)₆—O—CO—CH=CH₂

Discotic liquid crystal compound (2)

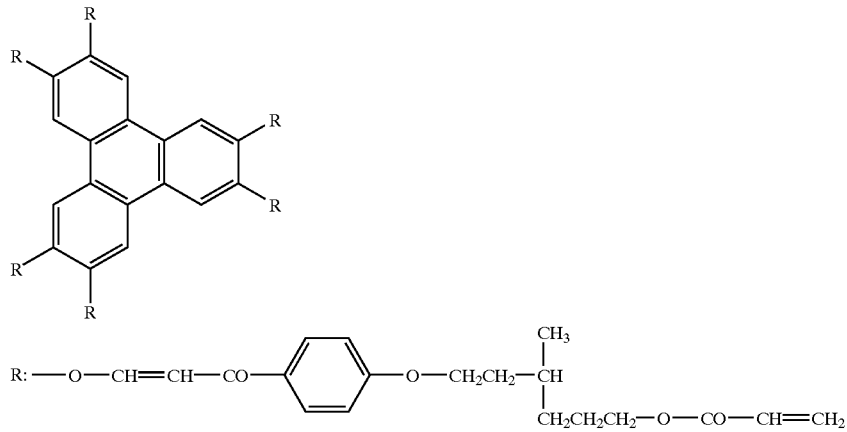

R: —O—CH=CH—CO—⟨C6H4⟩—O—CH₂CH₂—CH(CH₃)—CH₂CH₂CH₂—O—CO—CH=CH₂

Fluorine containing surface active agent

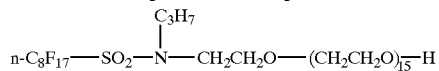

n-C₈F₁₇—SO₂—N(C₃H₇)—CH₂CH₂O—(CH₂CH₂O)₁₅—H

The coated layer was heated at 130° C. to essentially vertically align the discotic liquid crystal compound. The layer was irradiated with an ultraviolet ray for 4 seconds to polymerize the discotic liquid crystal compound and to fix the alignment. Thus an optical compensatory sheet was prepared. In the optically anisotropic layer, the discotic liquid crystal molecules are twisted, and are essentially vertically aligned.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 2300 to 2500.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 70° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 2

An optical compensatory sheet was prepared and evaluated in the same manner as in Example 1, except that a polyimide PI2 was used in place of the polyimide PI1. The average inclined angle of the discotic liquid crystal molecules was 70°.

EXAMPLE 3

An optical compensatory sheet was prepared and evaluated in the same manner as in Example 1, except that a polyimide PI3 was used in place of the polyimide PI1. The average inclined angle of the discotic liquid crystal molecules was 60°.

EXAMPLE 4

An optical compensatory sheet was prepared and evaluated in the same manner as in Example 1, except that a polyimide PI4 was used in place of the polyimide PI1. The average inclined angle of the discotic liquid crystal molecules was 75°.

Comparison Example 1

A commercially available inorganic material for a vertical orientation layer (EXP-OA004, Nissan Chemical Industries Ltd.) was diluted with methanol to a solid content of 2 wt. %. The diluted material was coated on a glass plate by using a bar coater (thickness: 0.4 μm), and dried at 140° C. to form an inorganic orientation layer. The orientation layer was subjected to a rubbing treatment.

Two antiparallel cells were prepared. A rod-like liquid crystal compound (MBBA) was inserted into one cell. A discotic liquid crystal compound (obtained by removing methyl ethyl ketone from the coating solution for optically anisotropic layer used in Example 1) was inserted into the other cell.

The alignment of the liquid crystal molecule was examined. The cell containing the rod-like liquid crystal molecules shows a nematic alignment of the molecules, which is vertical to a glass plate. On the other hand, the average inclined angle of the discotic liquid crystal molecules was 300. Therefore, the discotic liquid crystal molecules were not vertically (50° to 90°) aligned.

The tested material for a vertical orientation layer (EXP-OA004, Nissan Chemical Industries Ltd.) is commercially available, and is used for preparation of an orientation layer for a rod-like liquid crystal compound. The other commercially available materials for a vertical orientation layer were also tested in the same manner. As a result, vertical orientation layers for a rod-like liquid crystal compound were not effective in aligning a discotic liquid crystal compound vertically.

EXAMPLE 5

A liquid crystal display of an STN mode shown in FIG. 3(e) was prepared by using an optical compensatory sheet prepared in Example 1. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 6

An optical compensatory sheet was prepared and evaluated in the same manner as in Example 1, except that the following coating solution optically anisotropic layer was used. The results were the same as the results of Example 1.

| Coating solution for optically anisotropic layer | |
|---|---|
| The following discotic liquid crystal compound (3) | 63 weight parts |
| The discotic liquid crystal compound (2) used in Example 1 | 22 weight parts |
| The following polymerizable plasticizer | 10 weight parts |
| A photopolymerization initiator (Irgacure 907, Ciba-Geigy) | 1 weight part |
| Methyl ethyl ketone | 185 weight parts |

Discotic liquid crystal compound (3)

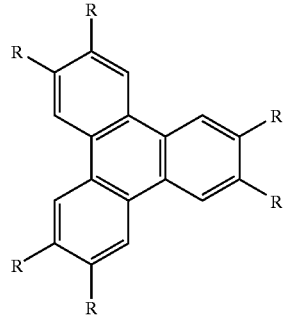

R: 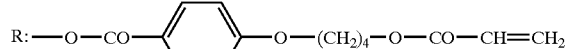

Polymerizable plasticizer

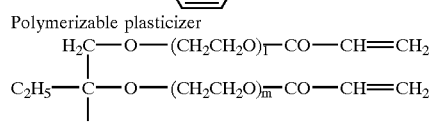

(l+m+n = 7)

EXAMPLE 7

A triacetyl cellulose film (thickness: 100 μm, size: 270 mm×100 mm, Fuji Tac, Fuji Photo Film Co., Ltd.) was used as a transparent substrate.

A fluorine containing polyimide PI31 was dissolved in a mixture of methanol and acetone (volume ratio: 50/50) to prepare a 5 wt. % solution. The solution was coated on the transparent substrate by using a bar coater (thickness: 1 μm), and air-dried at 120° C. for 2 minutes. The surface was subjected to a rubbing treatment to form an orientation layer.

An optically anisotropic layer was formed on the orientation layer in the same manner as in Example 1 to prepare an optical compensatory sheet.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 70° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 8

An optical compensatory sheet was prepared and evaluated in the same manner as in Example 7, except that a polyimide PI36 was used in place of the polyimide PI31. The average inclined angle of the discotic liquid crystal molecules was 70°.

EXAMPLE 9

An optical compensatory sheet was prepared and evaluated in the same manner as in Example 7, except that a polyimide PI50 was used in place of the polyimide PI31. The average inclined angle of the discotic liquid crystal molecules was 80°.

EXAMPLE 10

An optical compensatory sheet was prepared and evaluated in the same manner as in Example 7, except that a polyimide PI72 was used in place of the polyimide PI31. The average inclined angle of the discotic liquid crystal molecules was 75°.

EXAMPLE 11

A liquid crystal display of an STN mode shown in FIG. 3(e) was prepared by using an optical compensatory sheet prepared in Example 7. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 12

An optical compensatory sheet was prepared and evaluated in the same manner as in Example 7, except that the following coating solution optically anisotropic layer was used. The results were the same as the results of Example 7.

| Coating solution for optically anisotropic layer | |
|---|---|
| The discotic liquid crystal compound (3) used in Example 6 | 63 weight parts |
| The discotic liquid crystal compound (2) used in Example 1 | 22 weight parts |
| The polymerizable plasticizer used in Example 6 | 10 weight parts |

| -continued | |
|---|---|
| Coating solution for optically anisotropic layer | |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

We claim:

1. An optical compensatory sheet comprising a transparent substrate, an orientation layer and an optically anisotropic layer in consecutive order, said optically anisotropic layer comprising discotic liquid crystal molecules, wherein the orientation layer comprises a polymer having a hydrocarbon side chain containing 10 or more carbon atoms wherein said polymer has a steroid structure in its side chain or its main chain, wherein said discotic liquid crystal molecules are aligned at an average inclined angle in the range of 50° to 90°, said incline angle being uniform, and said discotic liquid crystal molecules being twisted at an average twist angle in the range of 90° to 360°, the average inclined angle being an average of angles between discotic planes of said discotic liquid crystal molecules and a surface of said transparent substrate or a surface of said orientation layer.

2. The optical compensatory sheet as defined in claim 1, wherein the polymer has a main chain of a polyimide structure.

3. The optical compensatory sheet as defined in claim 1, wherein the discotic liquid crystal molecules are polymerized.

4. The optical compensatory sheet as defined in claim 1, wherein the discotic liquid crystal molecules contain an asymmetric carbon atom.

5. The optical compensatory sheet as defined in claim 1, wherein the optically anisotropic layer further contains a chiral agent.

6. A liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in consecutive order, said transparent substrate being adjacent to the polarizing element, said optically anisotropic layer comprising discotic liquid crystal molecules, said orientation layer comprising a polymer having a hydrocarbon side chain containing 10 or more carbon atoms, wherein said polymer has a steroid structure in its side chain or its main chain, wherein said discotic liquid crystal molecules are aligned at an average inclined angle in the range of 50° to 90°, said inclined angle being uniform, and said discotic liquid crystal molecules being twisted at an average twist angle in the range of 90° to 360°, the average inclined angle being an average of angles between discotic planes of said discotic liquid crystal molecules and a surface of said transparent substrate or a surface of said orientation layer.

7. An optical compensatory sheet comprising a transparent substrate, an orientation layer and an optically anisotropic layer in consecutive order, said optically anisotropic layer comprising discotic liquid crystal molecules, wherein the orientation layer contains a fluoropolymer, wherein said discotic liquid crystal molecules are aligned at an average inclined angle in the range of 50° to 90°, said inclined angle being uniform, and said discotic liquid crystal molecules being twisted at an average twist angle in the range of 90° to 360°, the average inclined angle being an average of angles between discotic planes of said discotic liquid crystal molecules and a surface of said transparent substrate or a surface of said orientation layer.

8. The optical compensatory sheet as defined in claim 7, wherein the fluoropolymer has a main chain of a polyimide structure.

9. The optical compensatory sheet as defined in claim 7, wherein the fluoropolymer contains fluorine atoms in an amount of 0.05 to 80 wt. %.

10. The optical compensatory sheet as defined in claim 7, wherein the discotic liquid crystal molecules are polymerized.

11. The optical compensatory sheet as defined in claim 7, wherein the discotic liquid crystal molecules contain an asymmetric carbon atom.

12. The optical compensatory sheet as defined in claim 7, wherein the optically anisotropic layer further contains a chiral agent.

13. A liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in consecutive order, said transparent substrate being adjacent to the polarizing element, said optically anisotropic layer comprising discotic liquid crystal molecules, said orientation layer comprising a fluoropolymer, and wherein said discotic liquid crystal molecules are aligned at an average inclined angle in the range of 50° to 90°, said inclined angle being uniform, and said discotic liquid crystal molecules being twisted at an average twist angle in the range of 90° to 360°, the average inclined angle being an average of angles between discotic planes of said discotic liquid crystal molecules and a surface of said transparent substrate or a surface of said orientation layer.

14. The optical compensatory sheet as defined in claim 1, wherein the optically anisotropic layer further contains a fluorine containing surface active agent or a cellulose ester.

15. The optical compensatory sheet as defined in claim 14, wherein the fluorine containing surface active agent is represented by the following formula:

$$Rf—L^5—Hy$$

wherein Rf is a monovalent hydrocarbon group substituted with fluorine; $L^5$ is a single bond or divalent linking group; and Hy is a hydrophobic group.

16. The optical compensatory sheet as defined in claim 14, wherein the fluorine containing surface active agent is contained in an amount of 0.01 to 30 wt. % based on the amount of the discotic liquid crystal molecules.

17. The optical compensatory sheet as defined in claim 14, wherein the cellulose ester is a cellulose ester of a lower fatty acid having 1 to 6 carbon atoms.

18. The optical compensatory sheet as defined in claim 14, wherein the cellulose ester is contained in the range of 0.005 to 0.5 g per m².

19. The optical compensatory sheet as defined in claim 7, wherein the optically anisotropic layer further contains a fluorine containing surface active agent or a cellulose ester.

20. The optical compensatory sheet as defined in claim 19, wherein the fluorine containing surface active agent is represented by the following formula:

$$Rf—L^5—Hy$$

wherein Rf is a monovalent hydrocarbon group substituted with fluorine; $L^5$ is a single bond or divalent linking group; and Hy is a hydrophobic group.

21. The optical compensatory sheet as defined in claim 19, wherein the fluorine containing surface active agent is contained in an amount of 0.01 to 30 wt. % based on the amount of the discotic liquid crystal molecules.

22. The optical compensatory sheet as defined in claim 19, wherein the cellulose ester is a cellulose ester of a lower fatty acid having 1 to 6 carbon atoms.

23. The optical compensatory sheet as defined in claim 19, wherein the cellulose ester is contained in the range of 0.005 to 0.5 g per m².

* * * * *